United States Patent
Inoue et al.

(10) Patent No.: US 8,812,210 B2
(45) Date of Patent: Aug. 19, 2014

(54) VEHICLE BRAKE SYSTEM

(75) Inventors: Arata Inoue, Saitama (JP); Kenji Hattori, Saitama (JP); Kunimichi Hatano, Saitama (JP); Takaaki Ohnishi, Saitama (JP); Kazuaki Murayama, Saitama (JP); Kazuyoshi Akutsu, Saitama (JP); Kaoru Akahane, Saitama (JP); Makoto Sawai, Saitama (JP); Takehiro Horiuchi, Saitama (JP); Toru Mabuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/885,235

(22) PCT Filed: Nov. 11, 2011

(86) PCT No.: PCT/JP2011/076055
§ 371 (c)(1),
(2), (4) Date: Aug. 30, 2013

(87) PCT Pub. No.: WO2012/067032
PCT Pub. Date: May 24, 2012

(65) Prior Publication Data
US 2013/0333375 A1     Dec. 19, 2013

(30) Foreign Application Priority Data

Nov. 17, 2010  (JP) .................. 2010-257344
Nov. 17, 2010  (JP) .................. 2010-257356
Nov. 17, 2010  (JP) .................. 2010-257359

(51) Int. Cl.
*G06F 19/00*       (2011.01)

(52) U.S. Cl.
USPC .................. 701/70; 180/315; 701/78; 701/79; 701/80

(58) Field of Classification Search
USPC ........ 180/315; 701/70, 71, 78, 79, 80; 60/545
See application file for complete search history.

(56) References Cited

U.S. PATENT DOCUMENTS 3,902,763 A * 9/1975 Takeuchi ...................... 303/193
4,295,687 A * 10/1981 Becker et al. ................... 303/20

(Continued)

FOREIGN PATENT DOCUMENTS

EP        1 970 271 A1    9/2008
JP        H01-98768 U     7/1989

(Continued)

OTHER PUBLICATIONS

Extended European Search Report of Mar. 19, 2014 issued over the counterpart EP Patent Application 11 841 242.8.

*Primary Examiner* — Toan To
(74) *Attorney, Agent, or Firm* — Carrier Blackman & Associates, P.C.; Joseph P. Carrier; William D. Blackman

(57) ABSTRACT

The following are provided: an input device via which an operator inputs brake operations; a motor cylinder device that generates hydraulic brake pressure on the basis of electric signals based on said brake operations; and a VSA device that assists in stabilizing the behavior of the vehicle on the basis of the aforementioned hydraulic brake pressure generated by the motor cylinder device. Said input device, motor cylinder device, and VSA device are disposed, separated from each other, in an engine compartment partitioned off forwards of a dashboard.

15 Claims, 19 Drawing Sheets

(56) References Cited

U.S. PATENT DOCUMENTS

| | | | |
|---|---|---|---|
| 4,398,252 A * | 8/1983 | Frait | 701/70 |
| 6,058,705 A | 5/2000 | Schunck | |
| 6,817,178 B2 | 11/2004 | Enomoto et al. | |
| 8,639,427 B2 * | 1/2014 | Yasui | 701/70 |
| 2008/0230337 A1 | 9/2008 | Kajiyama et al. | |
| 2009/0079259 A1 * | 3/2009 | Iwasaki et al. | 303/146 |
| 2011/0035129 A1 * | 2/2011 | Yasui | 701/70 |
| 2013/0082514 A1 * | 4/2013 | Murakami et al. | 303/14 |
| 2013/0232965 A1 * | 9/2013 | Ohnishi et al. | 60/545 |
| 2013/0232968 A1 * | 9/2013 | Ohnishi et al. | 60/545 |
| 2013/0333376 A1 * | 12/2013 | Murayama et al. | 60/545 |
| 2014/0081546 A1 * | 3/2014 | Yasui | 701/74 |

FOREIGN PATENT DOCUMENTS

| | | |
|---|---|---|
| JP | H06-47068 U | 6/1994 |
| JP | 6-183330 A | 7/1994 |
| JP | 9-511967 A | 12/1997 |
| JP | 2001-180469 A | 7/2001 |
| JP | 2003-062642 A | 3/2003 |
| JP | 2005-239001 A | 9/2005 |
| JP | 2010-023594 A | 2/2010 |

* cited by examiner

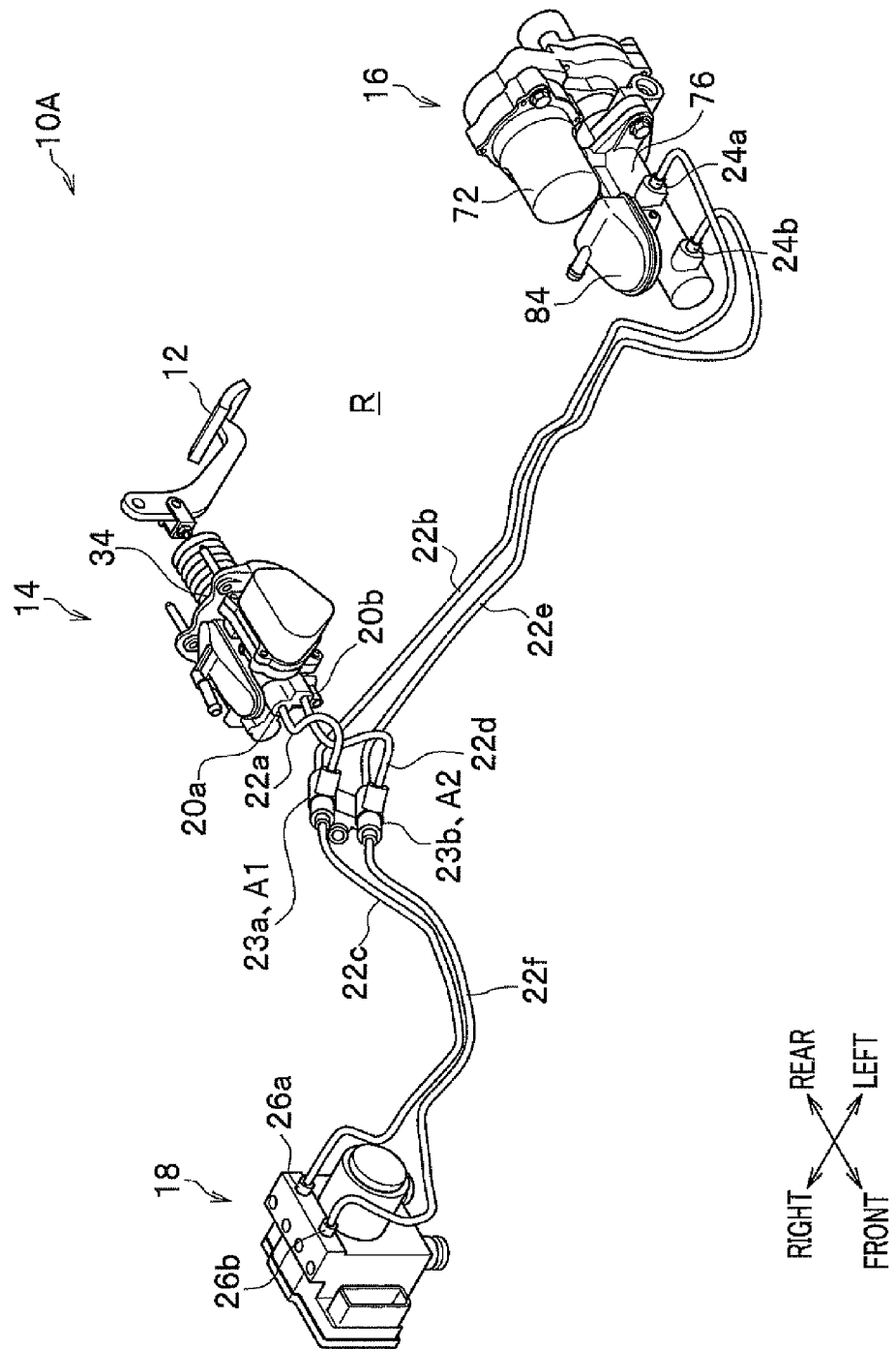

VEHICLE BRAKE SYSTEM

TECHNICAL FIELD

The present invention relates to vehicle brake systems.

BACKGROUND ART

Conventionally, it has been known that examples of a vehicle (automobile) brake system include those having a servo unit such as a negative pressure booster and an oil pressure booster. In addition, an electric servo unit using an electric motor as a power source has recently been known (see, for example, Patent Literature 1).

Patent Literature 1 discloses an electric servo unit including: a main piston which moves back and forth by brake pedal operation; a tubular booster piston which is fitted to the main piston in such a manner as to enable its position to be relatively changed; and an electric motor which moves the booster piston back and forth.

This electric servo unit uses the main piston and the booster piston as pistons of a master cylinder. The front end of each piston faces a pressure chamber of the master cylinder. An operator inputs a thrust to the main piston by using a brake pedal. Also, the electric motor inputs a booster thrust to the booster piston. Accordingly, these thrusts can generate a brake hydraulic pressure in the master cylinder.

CITATION LIST

Patent Literature

[Patent Literature 1] JP 2010-23594 A

SUMMARY OF INVENTION

Technical Problem

Patent Literature 1 discloses an electric servo unit including: a mechanism which generates a hydraulic pressure input through a brake pedal; and a mechanism which generates a hydraulic pressure input through an electric motor, wherein these mechanisms are integrated. Unfortunately, this configuration makes the whole unit tend to become larger and impairs its mounting freedom.

The present invention resolves the above previous problems. It is an object of the present invention to provide a vehicle brake system capable of increasing a mounting freedom.

Solution to Problem

A first aspect of the present invention provides a vehicle brake system including: an input device which receives an operators brake operation; an electric brake actuator which generates a brake hydraulic pressure based on an electric signal according to at least the brake operation; and a vehicle behavior-stabilizing device which assists vehicle behavior stabilization based on the brake hydraulic pressure generated in the electric brake actuator, wherein the input device, the electric brake actuator, and the vehicle behavior-stabilizing device are separately disposed from one another in a room for structures, the room being partitioned in front of a dashboard.

According to the first aspect of the present invention, the input device, the electric brake actuator, and the vehicle behavior-stabilizing device are separated (individualized) from one another. This configuration can make the size of each of the input device, the electric brake actuator, and the vehicle behavior-stabilizing device smaller, and can increase their mounting freedom. That is, the room for structures carries various devices, as structures, such as not only brake-related devices but also a power source (an engine and/or a drive motor), a transmission, a cooling system (e.g., a radiator), and a low-voltage battery. This should make it difficult to keep a large empty space (installation space). The present invention, however, has a configuration in which an input device, an electric brake actuator, and a vehicle behavior-stabilizing device are separated from one another. This configuration can make the size of each device smaller and can make it unnecessary to procure a large empty space. Each device can therefore be mounted even in a narrow empty space.

According to the first aspect of the present invention, the input device, the electric brake actuator, and the vehicle behavior-stabilizing device are separated from one another. This configuration can enhance general-purpose properties of each device (the input device, the electric brake actuator, and the vehicle behavior-stabilizing device), and can make it easier to use each device in different car models.

A second aspect of the present invention provides a vehicle brake system, wherein the input device is attached to the dashboard; and the electric brake actuator is disposed at a position distal from the input device.

By the way, an input device is to receive a driver's (operator's) brake operation, so that the input device is usually attached to a dashboard near the driver. Meanwhile, an electric brake actuator includes an electric transmission mechanism for generating a brake hydraulic pressure based on an electric signal, so that operation of the transmission mechanism causes occurrence of noise and vibration. According to the second aspect of the present invention, the input device and the electric brake actuator are arranged with a distance, so that the electric brake actuator, which may be a source of generating noise and vibration, can be disposed at a position distal from a driver. This configuration can help prevent the driver from experiencing discomfort (uncomfortable feeling) due to the noise and vibration.

A third aspect of the present invention provides a vehicle brake system, wherein the input device and the vehicle behavior-stabilizing device are connected via first piping; the electric brake actuator is connected using a pipe with three branches to the first piping; and second piping is used to connect the electric brake actuator to the first piping connecting the input device and the vehicle behavior-stabilizing device, the second piping being disposed near the first piping.

According to the third aspect of the present invention, the pipe with three branches is used to connect the first and the second piping, and the electric brake actuator is disposed near the first piping. This configuration can shorten the length of the second piping. In addition, most of a passage from the electric brake actuator to the vehicle behavior-stabilizing device can be shared with the first piping, so that the entire piping length can be short.

A fourth aspect of the present invention provides a vehicle brake system, wherein the input device has a reservoir which supplies brake fluid to the electric brake actuator; and the electric brake actuator is disposed below the input device.

According to the fourth aspect of the present invention, gravity action can send the brake fluid in the reservoir to the electric brake actuator without using a pressure pump. In addition, this configuration can help prevent air from being incorporated in the electric brake actuator.

A fifth aspect of the present invention provides a vehicle brake system, wherein the electric brake actuator is arranged at an opposite side of the vehicle behavior-stabilizing device in a widthwise direction of a vehicle.

According to the fifth aspect of the present invention, the room for structures less frequently has a one-sided empty space at either the right or left side in a widthwise direction of a vehicle. Then, the electric brake actuator is arranged at an opposite side of the vehicle behavior-stabilizing device in the widthwise direction. This configuration makes it easier to procure an empty space, and the layout design becomes easy.

A sixth aspect of the present invention provides a vehicle brake system, wherein the electric brake actuator is arranged at the same side of the vehicle behavior-stabilizing device in a widthwise direction of a vehicle.

According to the sixth aspect of the present invention, the electric brake actuator and the vehicle behavior-stabilizing device are arranged nearby, so that the piping length of the connection between the electric brake actuator and the vehicle behavior-stabilizing device can be shortened.

A seventh aspect of the present invention provides a vehicle brake system, wherein the input device, the electric brake actuator, and the vehicle behavior-stabilizing device are all arranged in the same side of a vehicle in a widthwise direction.

According to the seventh aspect of the present invention, the input device, the electric brake actuator, and the vehicle behavior-stabilizing device can be arranged nearby, so that the piping length (entire piping length) of the connection among the input device, the electric brake actuator, and the vehicle behavior-stabilizing device can be shortened.

An eighth aspect of the present invention provides a vehicle brake system, wherein the electric brake actuator is disposed in rear of the vehicle behavior-stabilizing device.

According to the eighth aspect of the present invention, the electric brake actuator can be disposed near the input device, so that the piping length of the connection between the electric brake actuator and the input device can be shortened.

According to a ninth aspect of the present invention, the vehicle behavior-stabilizing device may be disposed above the input device.

A tenth aspect of the present invention provides a vehicle brake system, wherein the input device and a damper housing installed in the room having a power device overlap in a front-rear direction of a vehicle.

According to the tenth aspect of the present invention, the damper housing is a component having a high rigidity and the damper housing and the input device overlap in a front-rear direction. Accordingly, when an impact is imposed on the damper housing from the front at the time of a crash, etc., deformation of the damper housing can be reduced. As a result, this configuration can help prevent the input device from moving backward and penetrating into a vehicle compartment behind the dashboard.

An eleventh aspect of the present invention provides a vehicle brake system, wherein the input device, the electric brake actuator, and the vehicle behavior-stabilizing device are connected via piping which transports brake fluid; the input device includes a master cylinder capable of generating a hydraulic pressure in a wheel cylinder at a time of an abnormal condition of the electric brake actuator; and the vehicle behavior-stabilizing device and the electric brake actuator are each connected via independent piping to an output port of the master cylinder.

A twelfth aspect of the present invention provides a vehicle brake system, wherein the input device, the electric brake actuator, and the vehicle behavior-stabilizing device are connected via piping which transports brake fluid; the input device includes a master cylinder capable of generating a hydraulic pressure in a wheel cylinder at a time of an abnormal condition of the electric brake actuator; and an output port of the master cylinder is connected via a pipe with branches on piping connecting the vehicle behavior-stabilizing device and the electric brake actuator.

According to the eleventh and twelfth aspects of the present invention, the input device, the electric brake actuator, and the vehicle behavior-stabilizing device are separated (individualized) from one another. This configuration can make the size of each of the input device, the electric brake actuator, and the vehicle behavior-stabilizing device smaller, and can increase their mounting freedom. That is, the room for structures carries various devices such as an engine and/or a drive motor, a transmission, a cooling system (e.g., a radiator), and a low-voltage battery. This should make it difficult to keep a large empty space (installation space). The present invention, however, has a configuration in which an input device, an electric brake actuator, and a vehicle behavior-stabilizing device are separated from one another. This configuration can make the size of each device smaller and can make it unnecessary to procure a large empty space. Each device can therefore be mounted even in a narrow empty space.

According to the eleventh and twelfth aspects of the present invention, the input device, the electric brake actuator, and the vehicle behavior-stabilizing device are separated from one another. This configuration makes it easier to use a conventional component as an alternative for each device component.

According to the eleventh and twelfth aspects of the present invention, the input device and the electric brake actuator are separated from each other, so that the electric brake actuator, which may be a source of generating noise and vibration, can be disposed at a position distal from a driver. This configuration can help prevent the driver from experiencing discomfort (uncomfortable feeling) due to the noise and vibration.

According to the eleventh and twelfth aspects of the present invention, the input device and the electric brake actuator are separated from each other, so that a mode of their connection can vary when they are connected via piping. Thus, the first and second aspects of the present invention can provide a vehicle brake system having excellent mountability on a vehicle.

According to the eleventh aspect of the present invention, the vehicle behavior-stabilizing device and the electric brake actuator are each connected via independent piping to an output port of the master cylinder. Because of this, when the vehicle behavior-stabilizing device and the electric brake actuator are separately disposed depending on an empty space (installation space) of each car model as described above, for example, the piping can be simply engineered. In addition, the system includes independent piping. Accordingly, at the time of replacement, for example, the piping can be individually replaced.

According to the twelfth aspect of the present invention, an output port of the master cylinder is connected via a pipe with branches on piping connecting the vehicle behavior-stabilizing device and the electric brake actuator. The length of piping used for their connection can be reduced when compared with that of the electric brake actuator according to the first aspect of the present invention.

A thirteenth aspect of the present invention provides a vehicle brake system, wherein the input device includes a housing including: a master cylinder which generates a hydraulic pressure according to an input through operation of a brake operator, the master cylinder extending in a front-rear direction of a vehicle; and a stroke simulator giving a brake operator a simulated operation reaction force, the stroke simulator being disposed in parallel to and in communication with the master cylinder, so that the stroke simulator and the master cylinder are integrated, wherein bosses are formed beforehand at a plurality of locations in the housing; and a port can be produced in the boss at any of the locations.

According to the thirteenth aspect of the present invention, bosses are formed beforehand at a plurality of locations. Accordingly, when a first boss cannot be used due to a restriction of layout between a vehicle body and an engine, for example, a port can be produced in a second boss to manage the situation. That is, changing the boss having a port makes it possible to install devices even in a narrow empty space. Hence, this configuration can increase a mounting freedom.

In addition, when it is difficult to produce a port (connect piping) in a first direction due to a restriction of layout, formation of bosses in two different directions allows for a change in a movement range and direction of a tool used for connecting the piping, so that a port can be produced in a second direction.

A fourteenth aspect of the present invention provides a vehicle brake system, wherein the port produced is connected to the vehicle behavior-stabilizing device which assists the vehicle behavior stabilization based on the brake hydraulic pressure generated in the electric brake actuator.

According to the fourteenth aspect of the present invention, since a port produced in the boss is connected to the vehicle behavior-stabilizing device, the electric brake actuator can be connected to and interposed between the input device and the vehicle behavior-stabilizing device. This configuration can have shorter piping for flowing brake fluid than a vehicle brake system in which an input device is first connected to an electric brake actuator and the electric brake actuator is then connected to a vehicle behavior-stabilizing device.

A fifteenth aspect of the present invention provides a vehicle brake system, wherein a port to connect to the electric brake actuator is produced in the unprocessed boss.

According to the fifteenth aspect of the present invention, there is no need to create a new boss in the input device so as to connect to the electric brake actuator. A hole for a port should be just created in the boss that has been formed beforehand. This makes it easier to produce a port for connecting to the electric brake actuator.

A sixteenth aspect of the present invention provides a vehicle brake system, wherein a tool insertion hole for brake fluid filling and/or for air bleeding is created in the unprocessed boss.

According to the sixteenth aspect of the present invention, there is no need to create a new tool insertion hole for brake fluid filling and/or for air bleeding, so that the tool insertion hole can be easily created.

Advantageous Effects of Invention

The present invention can provide a vehicle brake system capable of increasing a mounting freedom.

BRIEF DESCRIPTION OF DRAWINGS

FIG. 3 is a perspective view illustrating how to configure, in a vehicle, a vehicle brake system according to the first embodiment.

FIG. 4 is schematic representations of how to arrange a vehicle brake system according to the first embodiment.

FIG. 6A represents a configuration viewed from the right side of a vehicle. FIG. 6B represents a configuration viewed from the front of the vehicle.

FIG. 13 illustrates a modified embodiment of a motor cylinder device.

FIG. 18 is schematic diagrams illustrating how to deploy a tool when a pipe is connected to an input device according to an embodiment.

FIG. 19 is schematic diagrams illustrating another example of how to deploy a tool when a pipe is connected to an input device according to an embodiment.

DESCRIPTION OF EMBODIMENTS

The following describes embodiments according to the present invention by referring to FIGS. 1 to 12. Note that the following vehicle brake systems 10A to 10E are described by using a vehicle V having a power device 3 in an engine room R as an example. The vehicle is not limited to the above example, but a vehicle having the power device 3 in rear of a vehicle compartment C may also be applicable. In addition, unless otherwise indicated, the terms "front", "rear", "left", and "right" used herein below refer to each reference direction of the vehicle V.

Vehicle brake systems 10A to 10E according to embodiments of the present invention include both a by-wire brake system which actuates a brake by transmitting an electric signal as a regular mechanism and a conventional oil-pressure brake system which actuates a brake by transferring an oil pressure as a fail-safe mechanism.

First Embodiment

Figure 1:
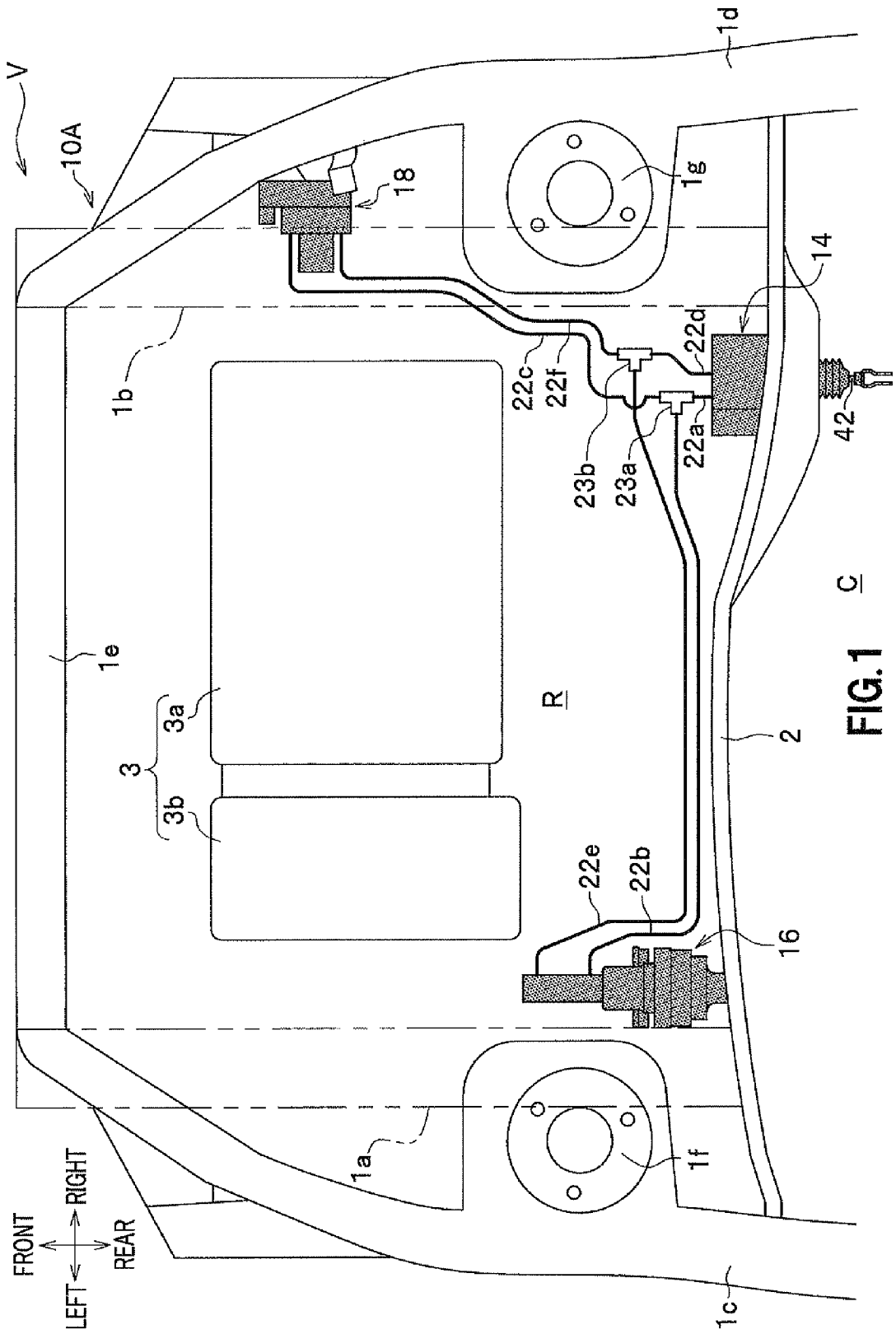
FIG. 1 illustrates how to configure, in a vehicle, a vehicle brake system according to the first embodiment.

As illustrated in FIG. 1, a vehicle brake system 10A basically includes: an input device 14 which receives a driver's (operator's) brake operation; a motor cylinder device (electric brake actuator) 16 which generates a brake hydraulic pressure based on an electric signal according to at least the brake operation; a Vehicle Stability Assist device 18 (vehicle behavior-stabilizing device; hereinafter, referred to as the VSA device 18; the "VSA" is a registered trademark) which assists vehicle behavior stabilization based on the brake hydraulic pressure generated in this motor cylinder device 16, wherein the input device 14, the motor cylinder device 16, and the VSA device 18 are arranged in an engine room (room for structures) R of a vehicle V.

Note that the motor cylinder device 16 may include means for generating a hydraulic pressure based on not only an electric signal according to the driver's brake operation but also an electric signal according to another physical quantity. The electric signal according to another physical quantity means a signal for determining a status surrounding a vehicle V by an ECU (Electronic Control Unit) using, for example, a sensor to avoid collision of the vehicle V without depending on the driver's brake operation. This system is something like an automatic braking system An engine room R is partitioned in front of a dashboard 2, and is surrounded by a configuration including: a pair of front side frames 1a and 1b disposed at both left and right sides in a widthwise direction and extending along a vehicle body in a front-rear direction; a pair of upper members 1c and 1d disposed at an upper location with a predetermined distance from the pair of front side frames 1a and 1b and extending along a vehicle body in a front-rear direction; a bulk head connector 1e including an approximately rectangular framework made of a plurality of members connected to the front ends of the pair of front side frames 1a and 1b; damper housings 1f and 1g disposed at rear positions of the pair of upper members 1c and 1d in a front-rear direction, each housing supporting a strut (not shown); and the like. Note that the strut (not shown) is constructed as a front wheel damper including, for example, a coiled spring which absorbs a shock and a shock absorber which reduces vibration.

Also, the engine room R has the vehicle brake system 10A as well as structures such as the power device 3. The power device 3 is used for a hybrid vehicle in which an engine 3a, an electric motor (a drive motor) 3b, and a transmission, for example, are combined. The power device 3 is positioned at substantially the center in a space of the engine room R. Note that left and right front wheels are powered through a transmission mechanism (not shown) by motor force generated with the engine 3a and the electric motor 3b. In addition, a high-voltage battery (e.g., a lithium ion battery) at which electric power (regenerative power) from the electric motor 3b is charged and which supplies electric power to the electric motor 3b is installed on the underfloor of a vehicle compartment C in the vehicle V and/or in rear of the vehicle compartment C. Note that the vehicle brake system 10A (10B to 10E) is applicable to any of front-wheel-drive, rear-wheel-drive, and four-wheel-drive vehicles.

Of note is that although the detail is not depicted, the power device 3 included in the engine room R is surrounded by various structures (auxiliary equipment) including, in addition to the below-described vehicle brake system 10A, an air intake system, an exhaust system, a cooling system, and an electrical system containing a low-voltage battery which supplies electric power to lamps, etc.

Here, the input device 14 is used for a right-hand drive vehicle. The input device 14 is attached via below-described stud bolts 303 (see FIG. 10) to the dashboard 2 at the right side of a vehicle in a widthwise direction. A push rod 42 connected to a brake pedal 12 (a brake operator; see FIG. 2) penetrates through the dashboard 2 to project into the vehicle compartment C.

A motor cylinder device 16 is disposed at the left side, an opposite side of the input device 14, of a vehicle in a widthwise direction. For example, the motor cylinder device 16 is mounted via a bracket (not shown) on the left front side frame 1a. Specifically, the motor cylinder device 16 has an elastic (floating) support on the bracket. A fastener member such as a bolt is used to fasten the bracket on the front side frame 1a. Alternatively, the bracket is attached to the front side frame 1a by welding. This configuration makes it possible to absorb vibration, etc., generated during operation of the motor cylinder device 16.

Examples of a function of the VSA device 18 include: an ABS (anti-lock brake system) function which prevents wheel lock during braking; a TCS (traction control system) function which prevents wheel spinning during acceleration, etc.; and a function which reduces skid during turning. The VSA device 18 is mounted via, for example, a bracket on a vehicle body at the front right side in a widthwise direction of the vehicle. Note that a vehicle behavior-stabilizing device is not limited to the VSA device 18. An ABS device which has only the ABS (anti-lock brake system) function to prevent wheel lock during braking may be employed.

These input device 14, motor cylinder device 16, and VSA device 18 are connected via hydraulic passages constructed using, for example, metal-made pipe members. These devices constitute a by-wire brake system, and a harness (not shown) is used to electrically connect an ECU (not shown) to the input device 14 and the motor cylinder device 16.

Figure 2:
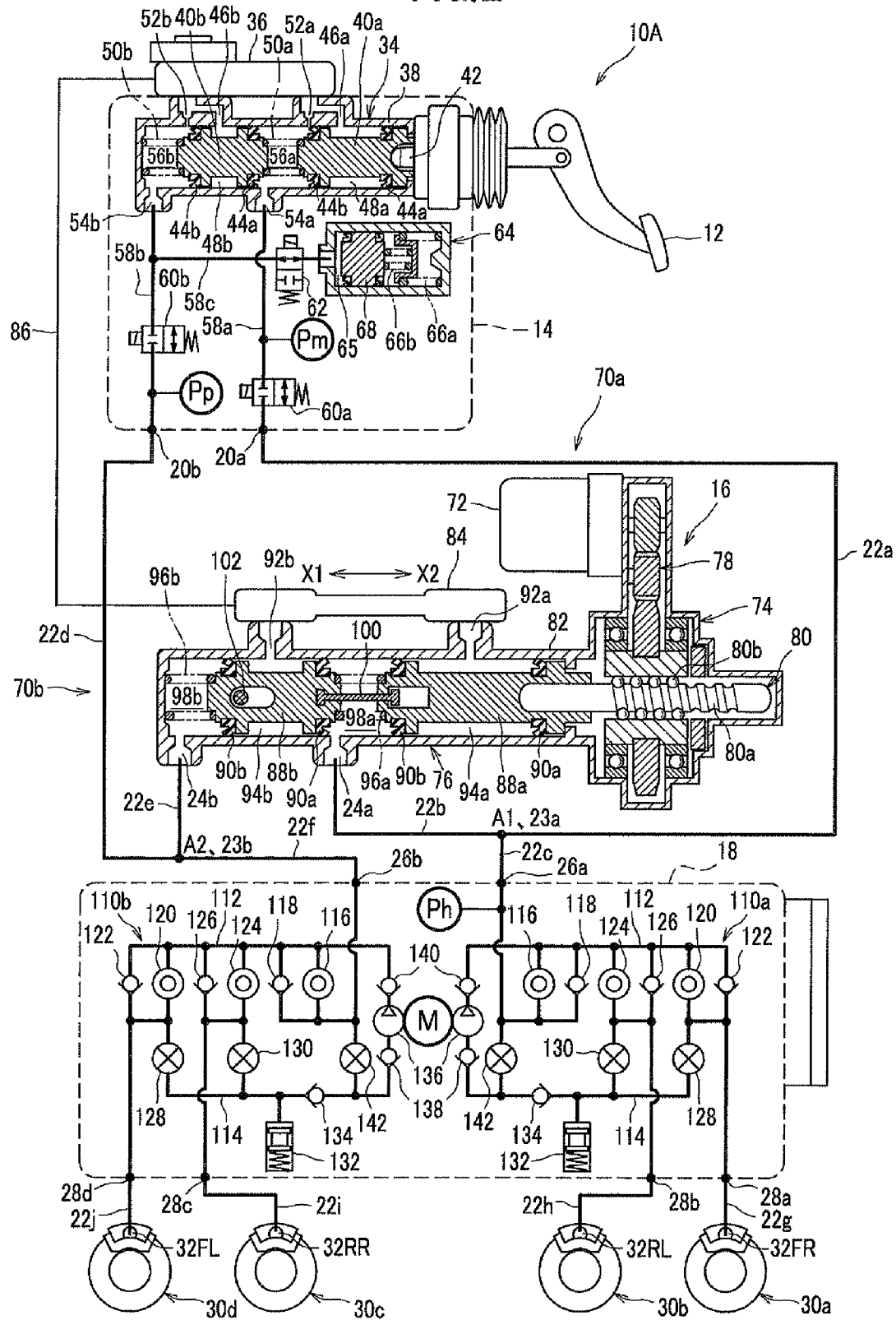
FIG. 2 outlines a vehicle brake system according to the first embodiment.

Specifically, the input device 14 and the VSA device 18 are connected each other via a first pipe 22a, a joint (a pipe with three branches; a branch pipe) 23a, and a third pipe 22c as a first hydraulic system 70a (see FIG. 2), and via a fourth pipe 22d, a joint (a pipe with three branches; a branch pipe) 23b, and a sixth pipe 22f as a second hydraulic system 70b (see FIG. 2).

In addition, the motor cylinder device 16 is connected via a second pipe 22b to the joint 23a as the first hydraulic system 70a (see FIG. 2) and is connected via a fifth pipe 22e to the joint 23b as the second hydraulic system 70b (see FIG. 2).

Hydraulic passages are illustrated with reference to FIG. 2. When a coupler A1 (joint 23a) shown in FIG. 2 is viewed as a reference point, the first pipe 22a connects the coupler A1 to a connection port 20a of the input device 14. In addition, the second pipe 22b connects the coupler A1 to an output port 24a of the motor cylinder device 16. Further, the third pipe 22c connects the coupler A1 to an inlet port 26a of the VSA device 18.

Also, when another coupler A2 (joint 23b) shown in FIG. 2 is viewed as a reference point, the fourth pipe 22d connects the coupler A2 to another connection port 20b of the input device 14. In addition, the fifth pipe 22e connects the coupler A2 to another output port 24b of the motor cylinder device 16. Further, the sixth pipe 22f connects the coupler A2 to another inlet port 26b of the VSA device 18.

The VSA device 18 has a plurality of outlet ports 28a to 28d. A seventh pipe 22g is used to connect the first outlet port 28a to a wheel cylinder 32FR of a disk brake mechanism 30a installed at the right front wheel. An eighth pipe 22h is used to connect the second outlet port 28b to a wheel cylinder 32RL of a disk brake mechanism 30b installed at the left rear wheel. A ninth pipe 22i is used to connect the third outlet port 28c to a wheel cylinder 32RR of a disk brake mechanism 30c installed at the right rear wheel. A tenth pipe 22j is used to connect the fourth outlet port 28d to a wheel cylinder 32FL of a disk brake mechanism 30d installed at the left front wheel.

The pipes 22g to 22j, which are connected to the outlet ports 28a to 28d, respectively, are used to supply brake fluid to the wheel cylinders 32FR, 32RL, 32RR, and 32FL of the disc brake mechanisms 30a to 30d, respectively. An increase in hydraulic pressure of each of the wheel cylinders 32FR, 32RL, 32RR, and 32FL causes each of the wheel cylinders 32FR, 32RL, 32RR, and 32FL to operate. This operation imparts braking force to the corresponding wheels (i.e., a right front wheel, a left rear wheel, a right rear wheel, and a left front wheel).

Note that the vehicle brake system 10A can be mounted on various vehicles including, for example, a hybrid vehicle, an electric vehicle, a fuel cell vehicle, and an automobile which can be powered only with an engine (an internal-combustion engine).

The input device 14 includes: a tandem master cylinder 34 which can generate a hydraulic pressure by a driver's operation of a brake pedal 12; and a first reservoir 36 which is provided with the master cylinder 34. A cylinder tube 38 of this master cylinder 34 includes two pistons 40a and 40b which are slidably disposed along an axial direction of the cylinder tube 38 with a predetermined interval. A first piston 40a is disposed near the brake pedal 12, and is connected via a push rod 42 to the brake pedal 12. Also, a second piston 40b is disposed at a position more distal from the brake pedal 12 than the first piston 40a.

A pair of piston packing 44a and 44b is fitted via a circular step to the outer periphery of the first and second pistons 40a and 40b, respectively. Back chambers 48a and 48b that are in communication with below-described supply ports 46a and 46b, respectively, are formed between the pair of piston packing 44a and 44b. Meanwhile, a spring member 50a is interposed between the first piston 40a and the second piston 40b. In addition, another spring member 50b is interposed between the second piston 40b and a lateral end of the cylinder tube 38. Note that instead of using the piston packing 44a and 44b on the outer periphery of the pistons 40a and 40b, packing may be disposed on the inner periphery of the cylinder tube 38.

The cylinder tube 38 of the master cylinder 34 includes two supply ports 46a and 46b, two relief ports 52a and 52b, and two output ports 54a and 54b. In this case, each supply port 46a (46b) and each relief port 52a (52b) are merged, so that they are connected to a reservoir chamber (not shown) of the first reservoir 36. Note that the first reservoir 36 corresponds to a reservoir set forth in the attached Claims.

Also, the cylinder tube 38 of the master cylinder 34 includes a first pressure chamber 56a and a second pressure chamber 56b, both of which control a brake hydraulic pressure according to pedal force produced by the driver's pressing the brake pedal 12. The first pressure chamber 56a is connected via the first hydraulic passage 58a to a connection port 20a. The second pressure chamber 56b is connected via the second hydraulic passage 58b to a connection port 20b.

A pressure sensor Pm is interposed between the master cylinder 34 and the connection port 20a, and is disposed at an upstream position of the first hydraulic passage 58a. A first shut-off valve 60a, which contains a normally open solenoid valve, is disposed at a downstream position of the first hydraulic passage 58a. This pressure sensor Pm detects a hydraulic pressure which is on the first hydraulic passage 58a and is at upstream of the first shut-off valve 60a at the master cylinder 34 side.

A second shut-off valve 60b, which contains a normally open solenoid valve, is interposed between the master cylinder 34 and another connection port 20b, and is disposed at an upstream position of the second hydraulic passage 58b. In addition, a pressure sensor Pp is disposed at a downstream position of the second hydraulic passage 58b. This pressure sensor Pp detects a hydraulic pressure which is on the second hydraulic passage 58b and is at downstream of the second shut-off valve 60b at the side of the wheel cylinders 32FR, 32RL, 32RR, and 32FL.

The term "normally open" used in the first shut-off valve 60a and the second shut-off valve 60b refers to a condition of a valve which remains an open position state (i.e., open at all times) when the valve is at a normal position (i.e., a valve position when electricity is turned off). Note that FIG. 2 illustrates a state of the first shut-off valve 60a and the second shut-off valve 60b when electricity is turned on (at the time of excitation) (the same applies to a third shut-off valve 62 described below).

The second hydraulic passage 58b between the master cylinder 34 and the second shut-off valve 60b has a hydraulic passage branch 58c which diverges from the second hydraulic passage 58b. A third shut-off valve 62, which contains a normally closed solenoid valve, and a stroke simulator 64 are connected in series on the hydraulic passage branch 58c. The term "normally closed" used in the third shut-off valve 62 refers to a condition of a valve which remains a closed position state when the valve is at a normal position (i.e., a valve position when electricity is turned off).

This stroke simulator 64 produces a stroke and operation reaction force according to operation of the brake pedal 12 when the first shut-off valve 60a and the second shut-off valve 60b are closed. This stroke simulator 64 is disposed on the second hydraulic passage 58b and is positioned upstream of the second shut-off valve 60b at the master cylinder 34 side. The stroke simulator 64 has a hydraulic chamber 65 which is in communication with the hydraulic passage branch 58c. The hydraulic chamber 65 can incorporate brake fluid that is discharged from the second pressure chamber 56b of the master cylinder 34.

Also, the stroke simulator 64 includes: a first return spring 66a having a high spring constant and a second return spring 66b having a low spring constant, which springs are arranged in series; and a simulator piston 68 which is actuated by the first return spring 66a and the second return spring 66b. When the brake pedal 12 is pressed at an early stage, a gradient of pedal reaction force is made to increase at a low rate. When the brake pedal 12 is pressed at a later stage, the pedal reaction force is made to increase at a high rate. This provides substantially the same pedal feeling of the brake pedal 12 as that of the existing master cylinder.

The hydraulic passages are largely classified into a first hydraulic system 70a which connects the first pressure chamber 56a of the master cylinder 34 to a plurality of wheel cylinders 32FR and 32RL and a second hydraulic system 70b which connects the second pressure chamber 56b of the master cylinder 34 to a plurality of wheel cylinders 32RR and 32FL.

The first hydraulic system 70a includes: the first hydraulic passage 58a which connects the connection port 20a to the output port 54a of the master cylinder 34 (cylinder tube 38) of the input device 14; the pipes 22a and 22b which connect the connection port 20a of the input device 14 to the output port 24a of the motor cylinder device 16; the pipes 22b and 22c which connect the output port 24a of the motor cylinder device 16 to an inlet port 26a of the VSA device 18; and pipes 22g and 22h which connect each of outlet ports 28a and 28b of the VSA device 18 to each of the wheel cylinders 32FR and 32RL, respectively.

The second hydraulic system 70b includes: the second hydraulic passage 58b which connects another connection port 20b to the output port 54b of the master cylinder 34 (cylinder tube 38) of the input device 14; the pipes 22d and 22e which connect the connection port 20b of the input device 14 to the output port 24b of the motor cylinder device 16; the pipes 22e and 22f which connect the output port 24b of the motor cylinder device 16 to an inlet port 26b of the VSA device 18; and pipes 22i and 22j which connect each of outlet ports 28c and 28d of the VSA device 18 to each of the wheel cylinders 32RR and 32FL, respectively.

As a result, the first hydraulic system 70a and the second hydraulic system 70b are used to build the hydraulic passages. Consequently, the respective wheel cylinders 32FR and 32RL are independent of the respective wheel cylinders 32RR and 32FL at work. Mutually independent braking force can therefore be generated.

The motor cylinder device 16 includes an actuator mechanism 74 containing an electric motor 72 and a cylinder mechanism 76 actuated by the actuator mechanism 74.

The actuator mechanism 74 includes: a gear mechanism (reduction mechanism) 78 which delivers rotational driving force of the electric motor 72 while a plurality of gears are engaged, the gear mechanism being disposed at the output shaft side of the electric motor 72; and a ball screw structure 80 further including balls 80b and a ball screw shaft 80a which moves back and forth along the shaft direction while the rotational driving force is delivered through the gear mechanism 78.

The cylinder mechanism 76 includes an approximately cylindrical cylinder body 82 and a second reservoir 84 attached to the cylinder body 82. A pipe 86 is used to connect the second reservoir 84 to the first reservoir 36 attached to the master cylinder 34 of the input device 14. Brake fluid stored in the first reservoir 36 is supplied via the pipe 86 to the second reservoir 84.

The cylinder body 82 includes a first slave piston 88a and a second slave piston 88b which are slidably disposed along an axial direction of the cylinder body 82 with a predetermined interval. The first slave piston 88a is positioned near the ball screw structure 80, and comes into contact with an end of the ball screw shaft 80a. Meanwhile, the first slave piston 88a and this ball screw shaft are integrated, thereby changing their position in a direction denoted by the arrow X1 or X2. In addition, the second slave piston 88b is disposed at a more distal position from the ball screw structure 80 than the first slave piston 88a.

A pair of slave piston packing 90a and 90b is fitted via a circular step to the outer periphery of the first and second pistons 88a and 88b. A first back chamber 94a and a second back chamber 94b that are in communication with below-described reservoir ports 92a and 92b, respectively, are formed between the pair of slave piston packing 90a and 90b. A first return spring 96a is interposed between the first slave piston 88a and the second slave piston 88b. A second return spring 96b is interposed between the second slave piston 88b and a lateral end of the cylinder body 82.

The cylinder body 82 of the cylinder mechanism 76 includes two reservoir ports 92a and 92b and two output ports 24a and 24b. In this case, the reservoir port 92a (92b) is connected to a reservoir chamber (not shown) of the second reservoir 84.

In addition, the cylinder body 82 includes: a first hydraulic chamber 98a which controls a brake hydraulic pressure output from the output port 24a to the wheel cylinders 32FR and 32RL side; and a second hydraulic chamber 98b which controls a brake hydraulic pressure output from the output port 24b to the wheel cylinders 32RR and 32FL side.

Note that between the first slave piston 88a and the second slave piston 88b is provided restricting means 100 for restricting the maximum distance and the minimum distance between the first slave piston 88a and the second slave piston 88b. Moreover, the second slave piston 88b has a stopper pin 102 which restricts a sliding range of the second slave piston 88b and prevents the second slave piston from excessively returning to the first slave piston 88a side. Accordingly, when backup braking is operated using a brake hydraulic pressure generated in the master cylinder 34, in particular, because of failure in one system, this restricting means helps prevent failure of the other system.

The VSA device 18 is a well-known one and includes: a first brake system 110a which controls the first hydraulic system 70a connected to disk brake mechanisms 30a and 30b (wheel cylinder 32FR and wheel cylinder 32RL) corresponding to the right front wheel and the left rear wheel; and a second brake system 110b which controls the second hydraulic system 70b connected to disk brake mechanisms 30c and 30d (wheel cylinder 32RR and wheel cylinder 32FL) corresponding to the right rear wheel and the left front wheel. Note that the first brake system 110a may be composed of a hydraulic system connected to the disk brake mechanisms attached to the left front wheel and the right front wheel. Also note that the second brake system 110b may be composed of a hydraulic system connected to the disk brake mechanisms attached to the left rear wheel and the right rear wheel. Further, the first brake system 110a may be composed of a hydraulic system connected to the disk brake mechanisms attached to the right front wheel and the right rear wheel at one side of a vehicle body. Furthermore, the second brake system 110b may be composed of a hydraulic system connected to the disk brake mechanisms attached to the left front wheel and the left rear wheel at the other side of the vehicle body.

These first brake system 110a and second brake system 110b each have an identical structure. Accordingly, those corresponding to the first brake system 110a and the second brake system 110b have the same reference signs. The description is focused on the first brake system 110a, and the description regarding the second brake system 110b is indicated in parentheses.

The first brake system 110a (the second brake system 110b) has a first common hydraulic passage 112 and a second common hydraulic passage 114, both of which are shared between the wheel cylinders 32FR and 32RL (32RR and 32FL). The VSA device 18 includes: a regulator valve 116 containing a normally open solenoid valve interposed between the inlet port 26a and the first common hydraulic passage 112; a first check valve 118 which is disposed in parallel to the regulator valve 116 and permits a brake fluid flow from the inlet port 26a to the first common hydraulic passage 112 (blocks a brake fluid flow from the first common hydraulic passage 112 to the inlet port 26a); a first inner valve 120 containing a normally open solenoid valve interposed between the first common hydraulic passage 112 and the first outlet port 28a; a second check valve 122 which is disposed in parallel to the first inner valve 120 and permits a brake fluid flow from the first outlet port 28a to the first common hydraulic passage 112 (blocks a brake fluid flow from the first common hydraulic passage 112 to the first outlet port 28a); a second inner valve 124 containing a normally open solenoid valve interposed between the first common hydraulic passage 112 and the second outlet port 28b; and a third check valve 126 which is disposed in parallel to the second inner valve 124 and permits a brake fluid flow from the second outlet port 28b to the first common hydraulic passage 112 (blocks a brake fluid flow from the first common hydraulic passage 112 to the second outlet port 28b).

The VSA device 18 further includes: a first outer valve 128 containing a normally closed solenoid valve interposed between the first outlet port 28a and the second common hydraulic passage 114; a second outer valve 130 containing a normally closed solenoid valve interposed between the second outlet port 28b and the second common hydraulic passage 114; a reservoir 132 connected to the second common hydraulic passage 114; a fourth check valve 134 which is interposed between the first common hydraulic passage 112 and the second common hydraulic passage 114 and permits a brake fluid flow from the second common hydraulic passage 114 to the first common hydraulic passage 112 (blocks a brake fluid flow from the first common hydraulic passage 112 to the second common hydraulic passage 114); a pump 136 which is interposed between the fourth check valve 134 and the first common hydraulic passage 112 and supplies brake fluid from the second common hydraulic passage 114 to the first common hydraulic passage 112; an intake valve 138 and a discharge valve 140 which are disposed upstream and downstream, respectively, of the pump 136 and which permit a brake fluid flow from the second common hydraulic passage 114 to the first common hydraulic passage 112 (block a brake fluid flow from the first common hydraulic passage 112 to the second hydraulic passage 114); a motor M which drives the pump 136; and a suction valve 142 which is interposed between the second common hydraulic passage 114 and the inlet port 26a.

Note that in the first brake system 110a, the hydraulic passage proximal to the inlet port 26a has a pressure sensor Ph, which detects a brake hydraulic pressure that is output from the output port 24a of the motor cylinder device 16 and that is controlled in the first hydraulic chamber 98a of the motor cylinder device 16. A detection signal that has been detected with each of the pressure sensors Ps, Pp and Ph is input into control means (not shown).

The vehicle brake system 10A according to this embodiment is basically constructed as described above. Next, its advantages are described.

When the vehicle brake system 10A normally operates, that is, at a normal condition, the first shut-off valve 60a and the second shut-off valve 60b, both of which contain a normally open solenoid valve, are made to be closed by excitation. In addition, the third shut-off valve 62 containing a normally closed solenoid valve is made to be opened by excitation. Because the first shut-off valve 60a and the second shut-off valve 60b block the first hydraulic system 70a and the second hydraulic system 70b, respectively, a brake hydraulic pressure generated in the master cylinder 34 of the input device 14 is not transferred to the wheel cylinders 32FR, 32RL, 32RR, and 32FL of the disk brake mechanisms 30a to 30d.

In this case, the brake hydraulic pressure generated in the second pressure chamber 56b of the master cylinder 34 is transferred to the hydraulic chamber 65 of the stroke simulator 64 by way of the hydraulic passage branch 58c and the third shut-off valve 62 under the open condition. This pressure of the brake fluid supplied to the hydraulic chamber 65 causes the simulator piston 68 to act against the spring force of the return springs 66a and 66b and to be displaced. This displacement allows for a stroke of the brake pedal 12, and produces simulated pedal reaction force to impart the force to the brake pedal 12. This results in a comfortable brake feeling of a driver.

When the control means (not shown) detects a driver's pressing the brake pedal 12 under such a system condition, the control means drives the electric motor 72 of the motor cylinder device 16 to actuate the actuator mechanism 74. Then, the first slave piston 88a and the second slave piston 88a are made to act against the spring force of the first return spring 96a and the second return spring 96b, and the actuator mechanism 74 thus displaces the slave pistons in a direction indicated by the arrow X1 in FIG. 2. Displacing the first slave piston 88a and the second slave piston 88b applies pressure on brake fluid in each of the first hydraulic chamber 98a and the second hydraulic chamber 98b to have a good balance. Eventually, this can generate a desired brake hydraulic pressure.

The brake hydraulic pressures of the first hydraulic chamber 98a and the second hydraulic chamber 98b in this motor cylinder device 16 are transferred via the first and second inner valves 120 and 124, whose valve positions are open in the VSA device 18, to the wheel cylinders 32FR, 32RL, 32RR, and 32FL of the disk brake mechanisms 30a to 30d. Then, the wheel cylinders 32FR, 32RL, 32RR, and 32FL are actuated to produce desired braking force on each wheel.

In other words, in the vehicle brake system 10A according to this embodiment, when the motor cylinder device 16, which functions as an driving hydraulic source, and the by-wire-controlled ECU (not shown), etc., can operate normally (i.e., at the time of normal condition), the master cylinder 34 generates a brake hydraulic pressure by the driver's pressing the brake pedal 12. Then, the communication between the master cylinder 34 and the disk brake mechanisms 30a to 30d (wheel cylinders 32FR, 32RL, 32RR, and 32FL), which control each wheel, is blocked by the first shut-off valve 60a and the second shut-off valve 60b. While this blocking condition is kept, the motor cylinder device 16 generates a brake hydraulic pressure, which is used to actuate the disk brake mechanisms 30a to 30d. Accordingly, this system, what is called a brake-by-wire brake system, gets active. Because of the above, this embodiment is preferably applicable to a vehicle V having no negative pressure generated by a conventional internal-combustion engine. Examples of the vehicle V include an electric vehicle.

In contrast, when the motor cylinder device 16, etc., cannot operate (i.e., at the time of abnormal condition), the first shut-off valve 60a and the second shut-off valve 60b are opened and the third shut-off valve 62 is closed. Then, the brake hydraulic pressure generated in the master cylinder 34 is transferred to the disk brake mechanisms 30a to 30d (wheel cylinders 32FR, 32RL, 32RR, and 32FL) to actuate them. Accordingly, this system, what is called a conventional oil-pressure brake system, gets active.

As illustrated in FIG. 3, the master cylinder 34 of the input device 14 is directed in a front-rear direction of a vehicle. Connection ports 20a and 20b are close to each other and are arranged at the front of the input device 14. In addition, the input device 14 is connected via the first pipe 22a and the fourth pipe 22d to integrated joints 23a and 23b, respectively. Further, the joints 23a and 23b are connected via the third pipe 22c and the sixth pipe 22f to the VSA device 18. Note that since integrated into one structure, the joints 23a and 23b are easily secured to a vehicle body. The structure, however, is not limited to this configuration, but the joint 23a may be separated from the joint 23b.

The cylinder mechanism 76 of the motor cylinder device 16 is directed in a front-rear direction of a vehicle. The output ports 24a and 24b, which have been formed at a lateral side of the cylinder mechanism 76, are connected via the second pipe 22b and the fifth pipe 22e to the joints 23a and 23b, respectively. For example, the second pipe 22b and the fifth pipe 22e are close to each other and are installed near the dashboard 2 (see FIG. 1).

Figure 4B:
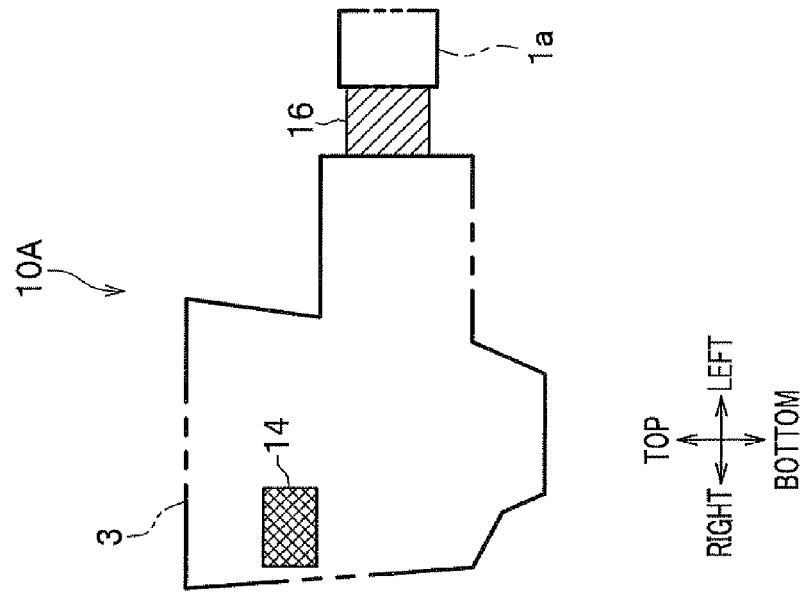
FIG. 4B represents a configuration viewed from the front of the vehicle.
Figure 4A:
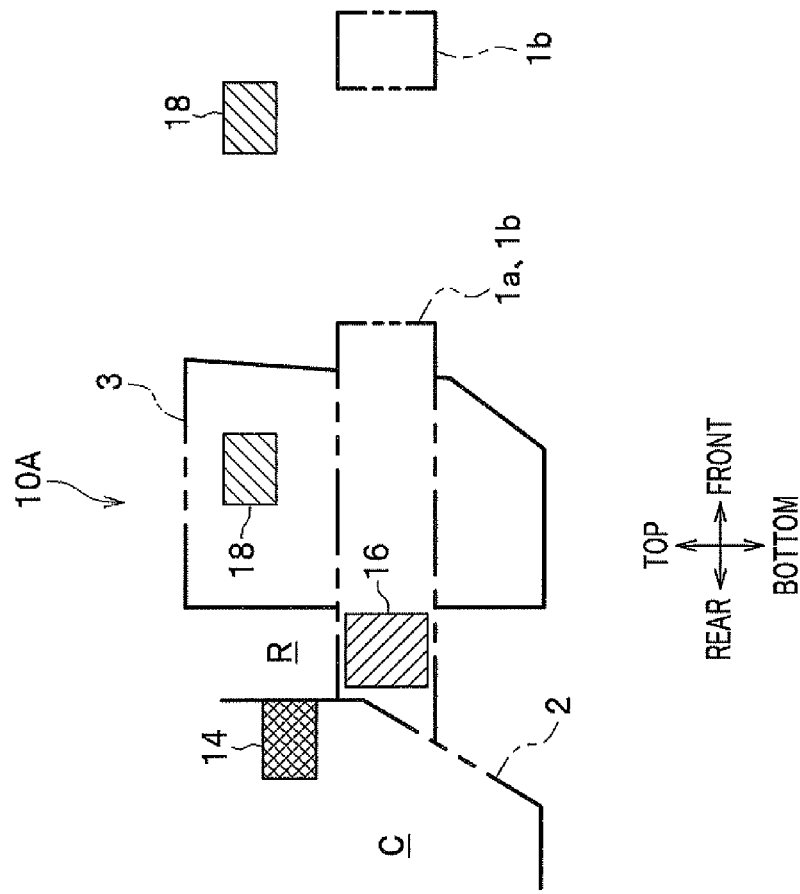
FIG. 4A represents a configuration viewed from the right side of a vehicle.

As illustrated in FIG. 4A, the motor cylinder device 16 is disposed below the input device 14. As detailed, the motor cylinder device 16 has a second reservoir 84 (see FIG. 2) that is disposed at a lower position than a first reservoir 36 (see FIG. 2) included in the input device 14. At that time, a pipe 86 (see FIG. 2) which connects the first reservoir 36 and the second reservoir 84 is disposed so as not to be positioned, between the first reservoir 36 and the second reservoir 84, at a lower position than the second reservoir 84.

Also, the motor cylinder device 16 is disposed in rear of the VSA device 18. But, the position of the motor cylinder device 16 is not limited to the position according to this embodiment, and may be in front of the VSA device 18. Further, the VSA device 18 may be disposed at the same height in a top-bottom direction (a vertical direction) as the motor cylinder device 16 or at a lower position than the motor cylinder device 16. The position of the VSA device can be appropriately modified depending on an empty space of the engine room R. Moreover, the VSA device 18 may be disposed at the same height in a top-bottom direction (a vertical direction) as the input device 14 or at a lower position than the input device 14. The position of the VSA device can be appropriately modified depending on an empty space of the engine room R.

As illustrated in FIG. 4B, the motor cylinder device 16 is interposed between the power device 3 and the front side frame 1a. As detailed, the motor cylinder device 16 is attached, for example, via a bracket (not shown) to the internal wall of the front side frame 1a in a widthwise direction of a vehicle. Even if the power device 3 moves backward at the time of a crash, the power device 3 is positioned so as not to contact the motor cylinder device 16.

As described above, in the vehicle brake system 10A according to the first embodiment, the input device 14, the motor cylinder device (electric brake actuator) 16, and the VSA device (vehicle behavior-stabilizing device) 18 are separately disposed from one another in the engine room (room for structures) R. This configuration makes the size of each of the input device 14, the motor cylinder device 16, and the VSA device 18 smaller, and can therefore increase their mounting freedom.

By the way, the engine room R includes various structures such as the power device 3 as well as an electrical system, an air intake system, an exhaust system, and a cooling system (in the case of an electric vehicle, a motor room includes structures such as an electrical system and a cooling system). Consequently, it is very difficult to procure a large empty space (installation space). According to this embodiment, the input device 14, the motor cylinder device 16, and the VSA device 18 are separated from one another. Consequently, the size of each device (the input device 14, the motor cylinder device 16, and the VSA device 18) can be reduced, so that it is unnecessary to procure a large empty space in the engine room R (in the motor room). This configuration allows each device (14, 16, 18) to be installed even in a narrow empty space inside the engine room R (the motor room), and makes it easy to deploy each device.

In addition, according to the first embodiment, the input device 14, the motor cylinder device 16, and the VSA device 18 are separated from one another. This configuration can enhance general-purpose properties of each device (the input device 14, the motor cylinder device 16, and the VSA device 18), thereby making it easier to use each device in different car models.

Meanwhile, the motor cylinder device 16 includes an actuator mechanism 74 for generating a brake hydraulic pressure based on an electric signal, so that operation of the actuator mechanism 74 causes occurrence of noise and vibration. According to this embodiment, the motor cylinder device 16 is positioned at the left side of the engine room R, and the input device 14 is positioned at the right side of the engine room R. Accordingly, the motor cylinder device 16 is arranged with distance from the input device 14. Thus, it is possible to dispose the motor cylinder device 16, which may generate noise and vibration, at a position distal from a driver. This configuration can help prevent the driver from experiencing discomfort (uncomfortable feeling) due to the noise and vibration.

In addition, according to the first embodiment, the motor cylinder device 16 is positioned below the input device 14. Consequently, gravity action can send brake fluid in the first reservoir 36 to the motor cylinder device 16 without using compressor means (e.g., a pump). Also, this configuration can help prevent air from being incorporated into the motor cylinder device 16 from the input device 14.

Further, the engine room R less frequently has a one-sided empty space at either the right or left side in a widthwise direction of a vehicle. As illustrated in the first embodiment, the motor cylinder device 16 is disposed at the opposite side of the VSA device 18 in the widthwise direction of the vehicle. This configuration makes it easier to procure an empty space to install these motor cylinder device 16 and VSA device 18, so that their mounting becomes easy.

Moreover, according to the first embodiment, the number of pipes connected to the input device 14 can be reduced from 4 (pipes 22b, 22c, 22e, and 22f in FIG. 10) as described below to 2 (pipes 22a and 22d in FIG. 3). A fixture to secure each pipe to a proper location in the engine room R can be more simplified and the number of locations for the fixture can also be reduced.

Second Embodiment

Figure 5:
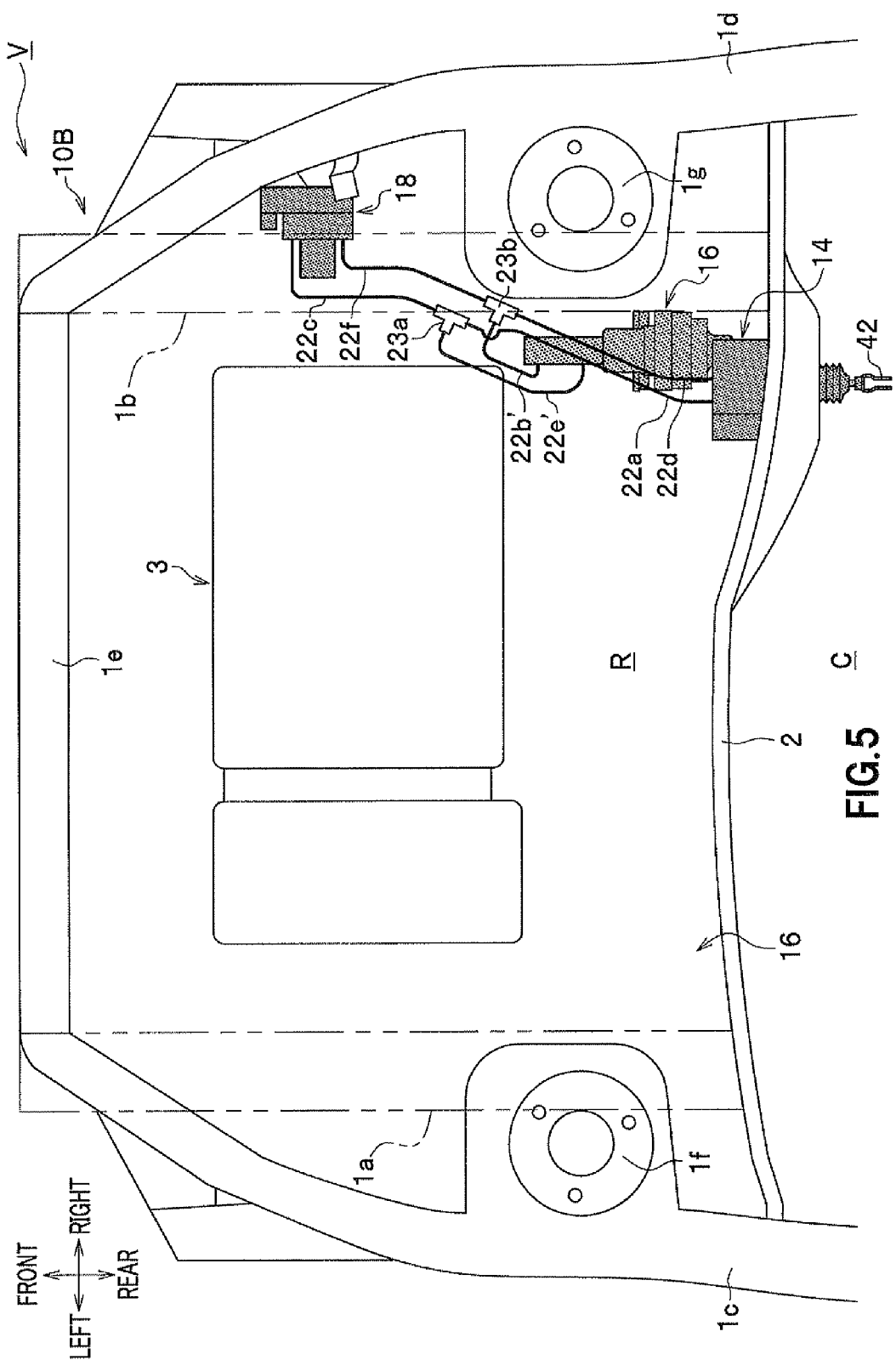
FIG. 5 illustrates how to configure, in a vehicle, a vehicle brake system according to the second embodiment.
Figure 6:
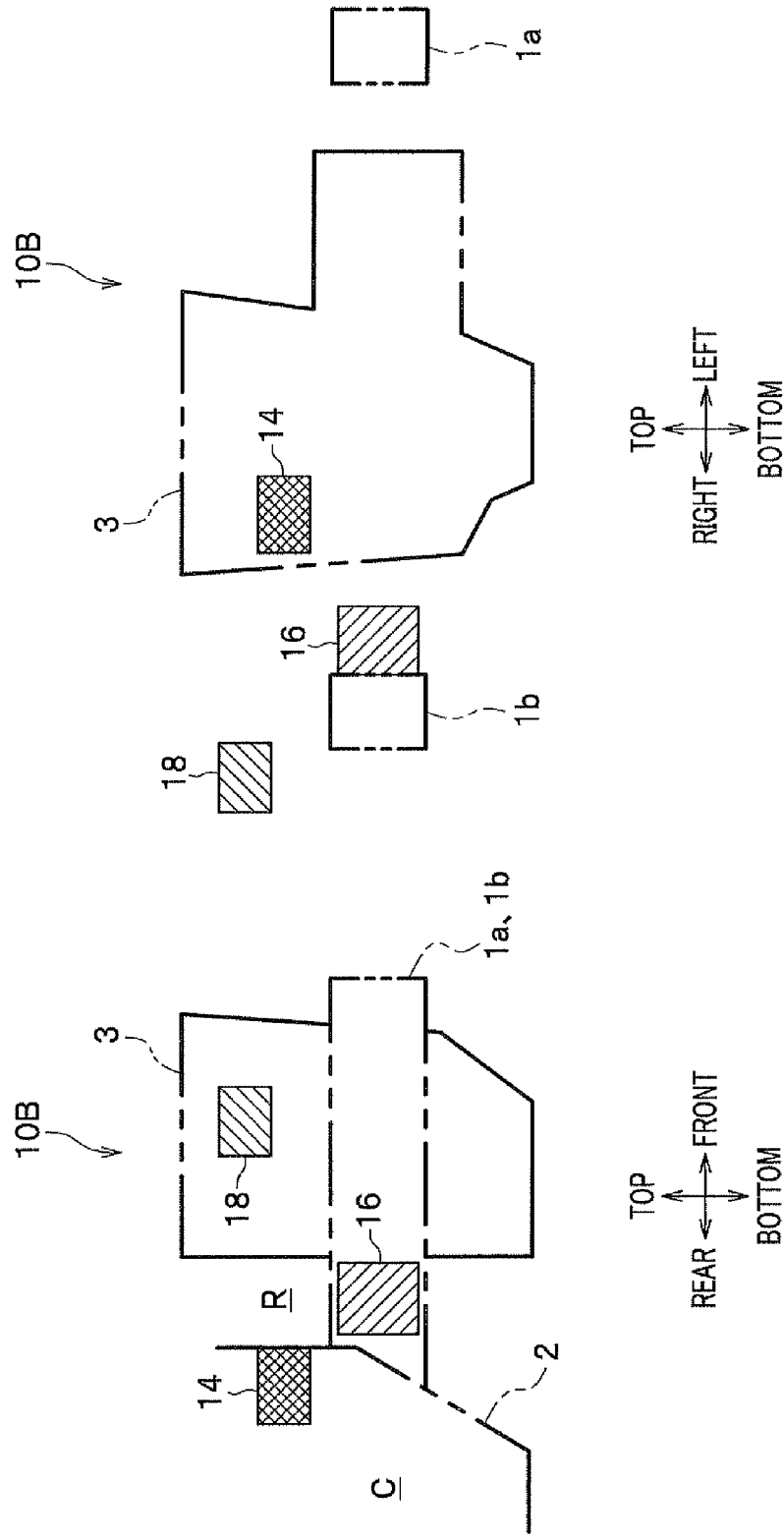
FIG. 6 is schematic representations of how to arrange a vehicle brake system according to the second embodiment.

FIG. 5 illustrates how to configure, in a vehicle, a vehicle brake system according to the second embodiment. FIG. 6 is schematic representations of how to arrange a vehicle brake system according to the second embodiment. FIG. 6A represents a configuration viewed from the right side of a vehicle. FIG. 6B represents a configuration viewed from the front of the vehicle. The elements similar to those of the first embodiment have the same reference signs so as to avoid description redundancy (the same applies to the following embodiments).

As illustrated in FIG. 5, in a vehicle brake system 10B, the input device 14 and the VSA device 18 are connected via the first pipe 22a, the fourth pipe 22d, the joints 23a and 23b, the third pipe 22c, and the sixth pipe 22f in a manner similar to the first embodiment. Note that the first pipe 22a and the third pipe 22c, as illustrated in FIG. 5, correspond to first piping set forth in the appended Claims. Likewise, the fourth pipe 22d and the sixth pipe 22f correspond to first piping set forth in the appended Claims.

In addition, the motor cylinder device 16 is positioned near the respective first piping and is connected via the second pipe 22b' and the fifth pipe 22e' to the joints 23a and 23b. Note that the second pipe 22b' and the fifth pipe 22e', as illustrated in FIG. 5, each correspond to second piping set forth in the appended Claims.

As illustrated in FIG. 6, the motor cylinder device 16 is attached, for example, via a bracket (not shown) to the front side frame 1b at the right side. Specifically, for example, the motor cylinder device 16 has an elastic (floating) support on the bracket (not shown) in a manner similar to the first embodiment. The bracket is welded or fastened with a bolt on the front side frame 1b.

In addition, the motor cylinder device 16, for example, is interposed between the front side frame 1b and the power device 3 (see FIG. 6). Even if the power device 3 moves backward at the time of a crash, the motor cylinder device 16 is disposed at a position so as not to contact the power device 3.

In this vehicle brake system 10B according to the second embodiment, the first piping is used to connect the input device 14 and the VSA device 18 as illustrated in FIG. 5. The motor cylinder device 16 is connected to the joints 23a and 23b (pipe with three branches) on the first piping. In this configuration, the connection of the motor cylinder device 16 uses the second piping disposed near the first piping which connects the input device 14 and the VSA device 18. According to this second embodiment, the length of the second piping (i.e., the second pipe 22b' and the fifth pipe 22e') can be shortened. Also, most of the hydraulic passage from the motor cylinder device 16 to the VSA device 18 can be shared with the first piping (the third pipe 22c and the sixth pipe 220. Consequently, the entire piping length (the first piping+the second piping) can be short.

Further, in the second embodiment, the input device 14, the motor cylinder device 16, and the VSA device 18 are all arranged in the same side in a widthwise direction of a vehicle (in this embodiment, at the right side). This configuration makes it possible to closely arrange the input device 14, the motor cylinder device 16, and the VSA device 18. The motor cylinder device 16 may be arranged at the right side not only in the piping connection configuration illustrated in FIG. 5 but also in the piping connection configuration illustrated in FIGS. 8 and 11. Even in these cases, the piping length (the entire piping length) can be shortened when the input device 14, the motor cylinder device 16, and the VSA device 18 are connected.

Note that in the second embodiment, the input device 14, the motor cylinder device 16, and the VSA device 18 are all arranged at the right side in a widthwise direction of a vehicle, but the configuration is not limited to this arrangement. For example, the input device 14, the motor cylinder device 16, and the VSA device 18 may be arranged along a widthwise direction of a vehicle. For example, the input device 14 may be attached to the right side of the dashboard 2 in a widthwise direction of a vehicle; the VSA device 18 may be attached to the left side of the dashboard 2 in the widthwise direction; and the motor cylinder device 16 may be attached to the dashboard 2 between the input device 14 and the VSA device 18.

Third Embodiment

Figure 7:
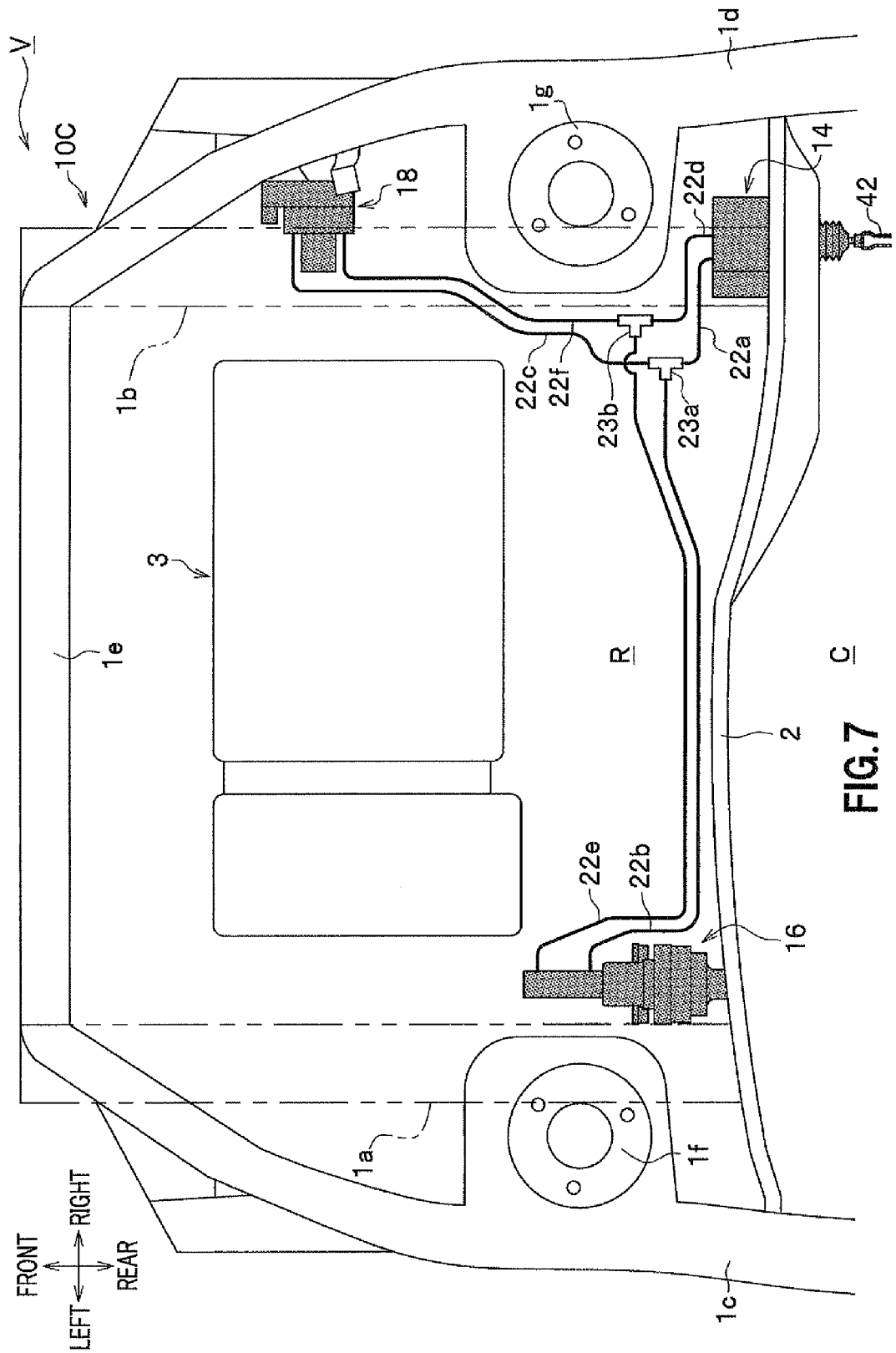
FIG. 7 illustrates how to configure, in a vehicle, a vehicle brake system according to the third embodiment.

FIG. 7 illustrates how to configure, in a vehicle, a vehicle brake system according to the third embodiment. In a vehicle brake system 10C according to the third embodiment, the arrangement of the input device 14 according to the first embodiment is altered.

As illustrated in FIG. 7, in the vehicle brake system 10C according to the third embodiment, the input device 14 and the right damper housing 1g in the engine room R overlap in a front-rear direction of a vehicle V.

In this vehicle brake system 10C according to the third embodiment, the damper housing 1g (1h) is a component supported by a shock absorber (not shown), the component having a high rigidity. In addition, the input device 14 and the damper housing 1g overlap in a front-rear direction. This arrangement makes it possible for the damper housing 1g to endure its deformation even if an impact is imposed on the damper housing 1g from the front at the time of a crash. As a result, this configuration can help prevent the input device 14 from moving backward and penetrating into a vehicle compartment C behind the dashboard 2.

Note that the third embodiment illustrates a configuration in which the damper housing 1g and almost the whole input device 14 overlap in a front-rear direction. However, as long as penetration of the input device 14 into the vehicle compartment C can be prevented at the time of a crash, etc., only a part of the input device 14 may overlap in the front-rear direction.

Fourth Embodiment

Figure 8:
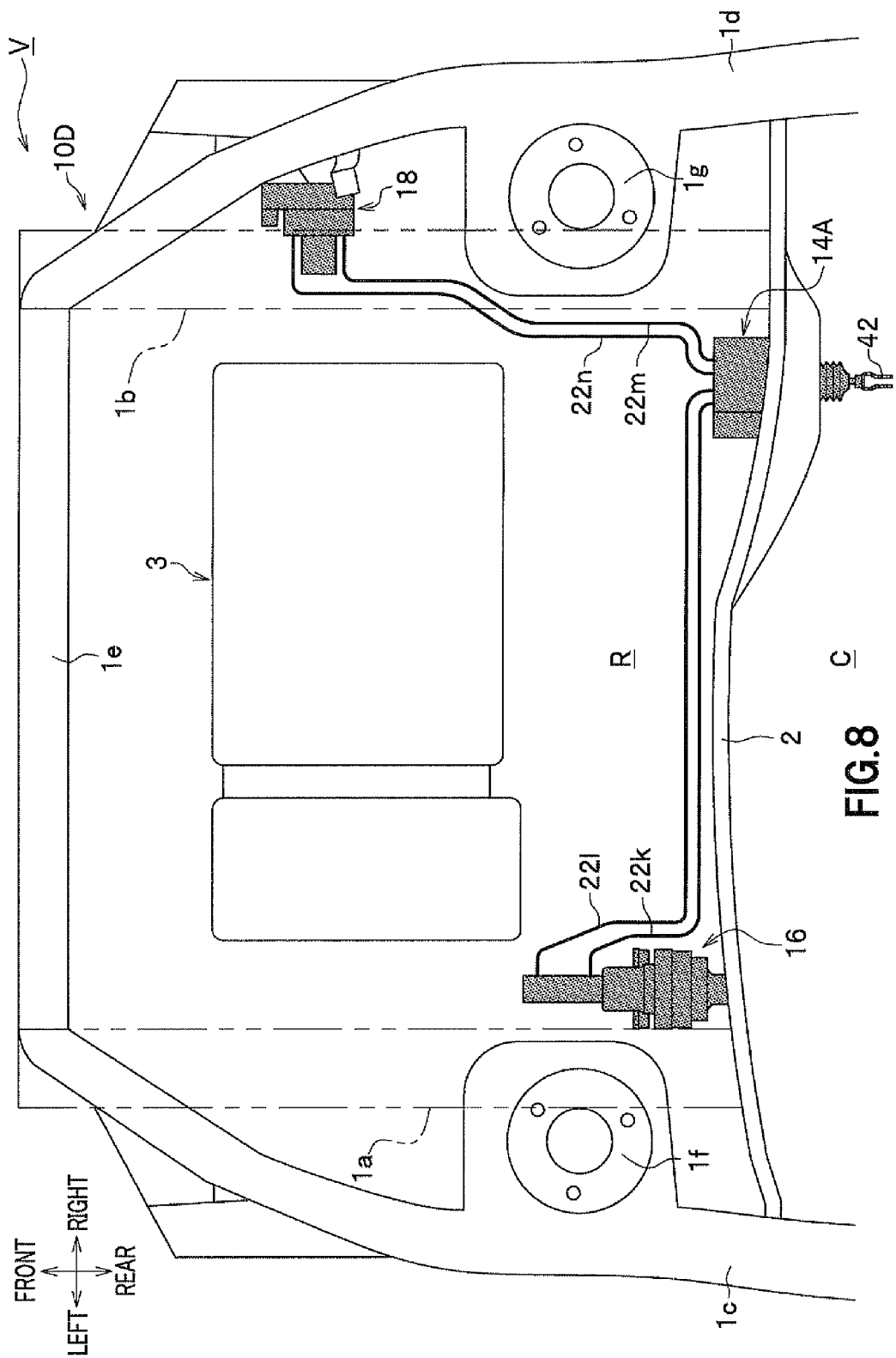
FIG. 8 illustrates how to configure a vehicle brake system according to the fourth embodiment.
Figure 9:
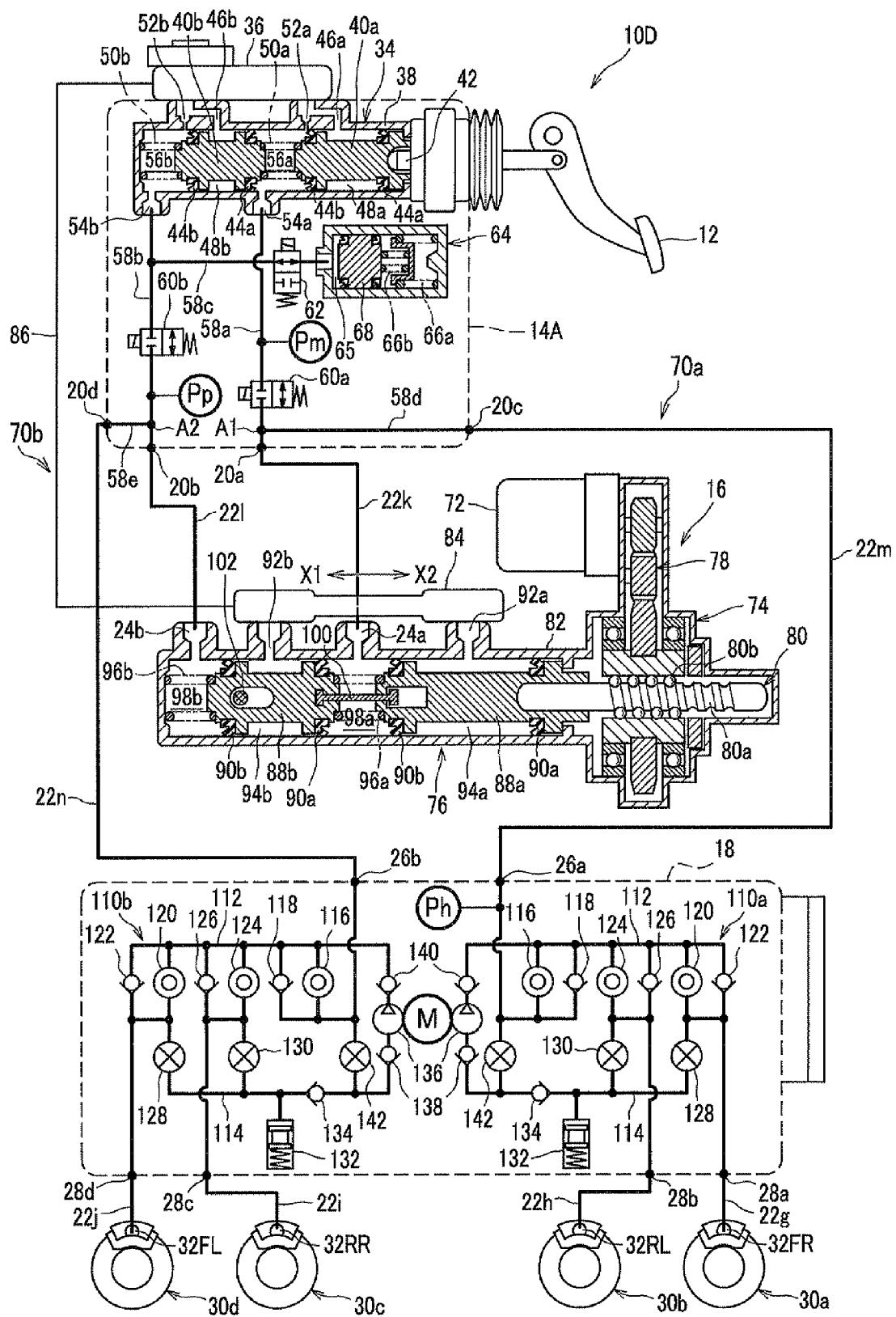
FIG. 9 outlines a vehicle brake system according to the fourth embodiment.
Figure 10:
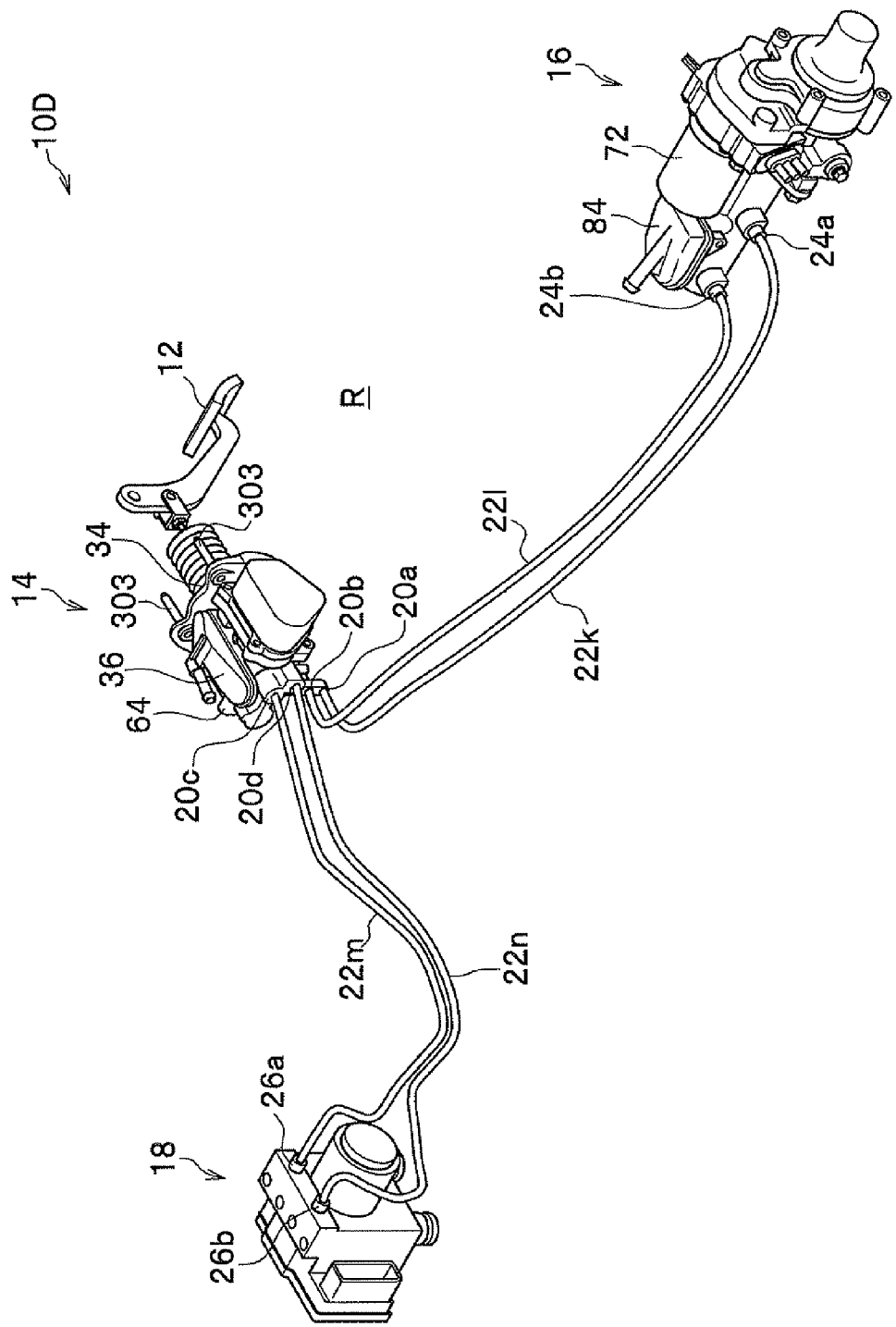
FIG. 10 is a perspective view illustrating how to configure, in a vehicle, a vehicle brake system according to the fourth embodiment.

FIG. 8 illustrates how to configure, in a vehicle, a vehicle brake system according to the fourth embodiment. FIG. 9 outlines a vehicle brake system according to the fourth embodiment. FIG. 10 is a perspective view illustrating how to configure, in a vehicle, a vehicle brake system according to the fourth embodiment. In a modified vehicle brake system 10D according to the fourth embodiment, an input device 14A has four ports (connection ports 20a, 20b, 20c, and 20d) whereas the input device 14 has two ports (connection ports 20a and 20b; see FIGS. 2 and 3).

As illustrated in FIGS. 8 and 10, the two connection ports 20a and 20b, which have been formed in the input device 14A, are connected via an eleventh pipe 22k and a twelfth pipe 22l to the motor cylinder device 16. In addition, the remaining two connection ports 20c and 20d of the input device 14A are connected via a thirteenth pipe 22m and a fourteenth pipe 22n to the VSA device 18. The positions of the input device 14A, the motor cylinder device 16, and the VSA device 18 are similar to those of the first embodiment.

As illustrated in FIG. 9, regarding the input device 14A, the first hydraulic passage 58a has a passage branch 58d that diverges at a location between the connection port 20a and the first shut-off valve 60a, and a connection port 20c connects this passage branch 58d and the thirteenth pipe 22m. Also, regarding the input device 14A, the second hydraulic passage 58b has a passage branch 58e that diverges at a location between the connection port 20b and the second shut-off valve 60b, and a connection port 20d connects this passage branch 58e and the fourteenth pipe 22n. That is, in the vehicle brake system 10D illustrated in FIG. 9, the input device 14A includes parts corresponding to the couplers A1 and A2 of the first embodiment.

The vehicle brake system 10D as so constructed can exert substantially the same effects as in the first embodiment. Further, the input device 14A, the motor cylinder device 16, and the VSA device 18 may be all arranged at the same side in the engine room R in a widthwise direction of a vehicle. This configuration makes it possible to shorten the entire piping length, compared with a case where the input device 14A is arranged at the opposite side of the motor cylinder device 16 in the widthwise direction Furthermore, a connection between a conventional all-in-one electric servo unit (see, for example, Patent Literature 1) and the VSA device has a one-to-one correspondence and the mode of the connection has no alternative. In contrast, according to the fourth embodiment, the input device 14, the motor cylinder device 16, and the VSA device 18 are separated. Accordingly, this configuration allows for a variation of the mode of the connection when these devices are connected with pipes. Thus, the fourth embodiment can provide a vehicle brake system 10D having excellent mountability on a vehicle V (see FIG. 1).

Moreover, according to the fourth embodiment, the connection ports 20a, 20b, 20c, and 20d of the input device 14 are each connected via each of the independent pipes 22k, 22l, 22m, and 22n to the VSA device 18 and the motor cylinder device 16. Because of this, when the VSA device 18 and the motor cylinder device 16 are separately disposed depending on an empty space (installation space) of each car model as described above, for example, the piping can be simply engineered. Besides, since the independent pipes 22k, 22l, 22m, and 22n are used for construction, the pipes 22k, 22l, 22m, and 22n can be individually replaced at the time of replacement.

Fifth Embodiment

Figure 11:
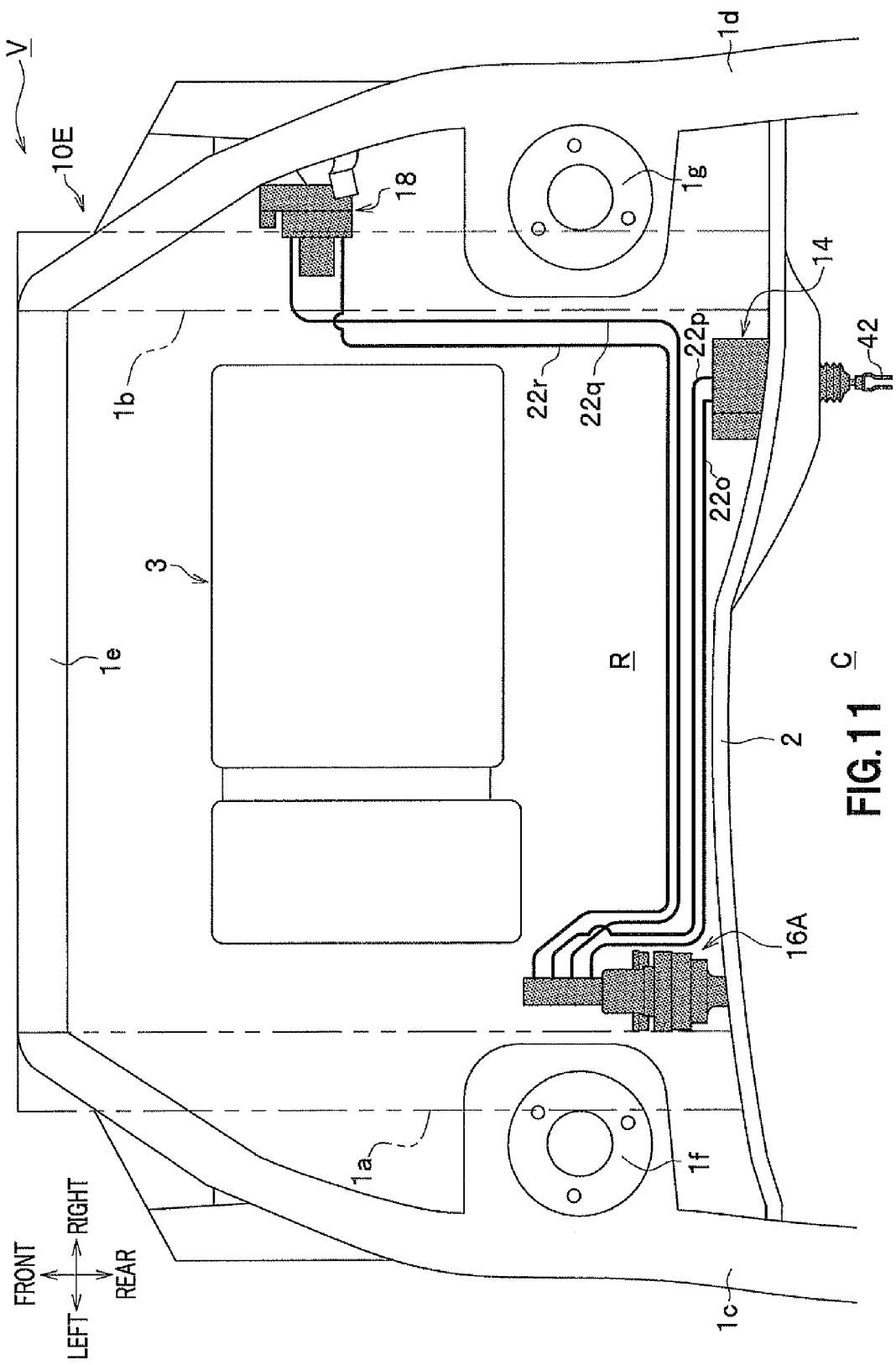
FIG. 11 illustrates how to configure a vehicle brake system according to the fifth embodiment.
Figure 12:
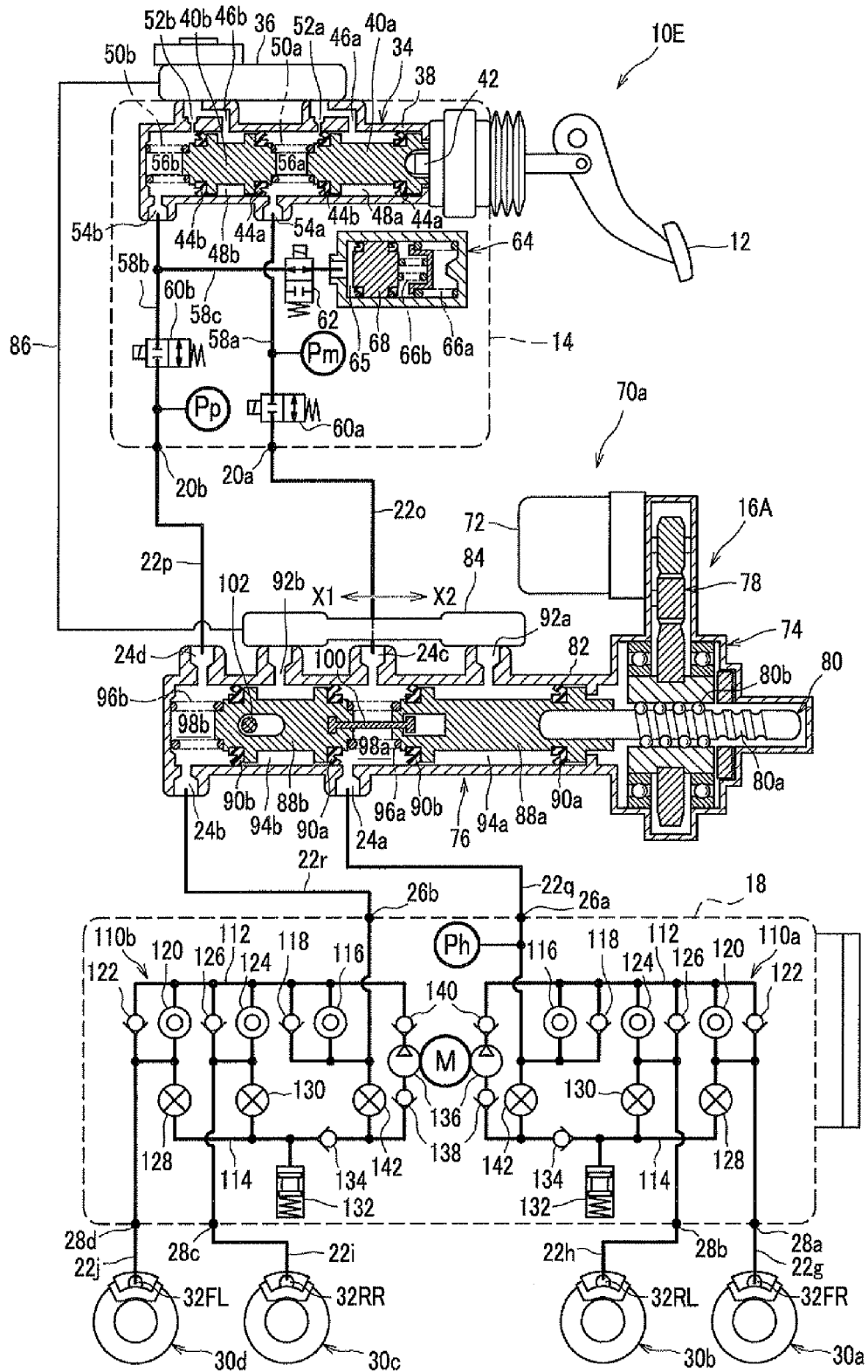
FIG. 12 outlines a vehicle brake system according to the fifth embodiment.

FIG. 11 illustrates how to configure a vehicle brake system according to the fifth embodiment. FIG. 12 outlines a vehicle brake system according to the fifth embodiment. In a vehicle brake system 10E according to the fifth embodiment, a motor cylinder device 16A has four ports (input ports 24c and 24d and output ports 24a and 24b) whereas the motor cylinder device 16 has two ports (output ports 24a and 24b).

As illustrated in FIG. 11, the input ports 24c and 24d (see FIG. 12) of the motor cylinder device 16A are connected via a fifteenth pipe 22o and a sixteenth pipe 22p, respectively, to the input device 14. In addition, the output ports 24a and 24b of the motor cylinder device 16A are connected via a seventeenth pipe 22q and a eighteenth pipe 22r, respectively, to the VSA device 18. Note that the positions of the input device 14A, the motor cylinder device 16, and the VSA device 18 are similar to those of the first embodiment.

As illustrated in FIG. 12, a cylinder mechanism 76 of the motor cylinder device 16A includes: output ports 24a and 24b; an input port 24c corresponding to the output port 24a; and an input port 24d corresponding to the output port 24b. The input port 24c is connected via the fifteenth pipe 22o to the connection port 20a, and the input port 24d is connected via the sixteenth pipe 22p to the connection port 20b. In addition, the output port 24a is connected via the seventeenth pipe 22q to the inlet port 26a of the VSA device 18, and the output port 24b is connected via the eighteenth pipe 22r to the inlet port 26b.

The vehicle brake system 10E as so constructed can exert substantially the same effects as in the first embodiment. Further, although it is not depicted, the input device 14, the motor cylinder device 16A, and the VSA device 18 may be all arranged at the same side in the engine room R in a widthwise direction of a vehicle in FIG. 11. This configuration makes it possible to shorten the entire piping length, compared with a case where the input device 14 is arranged at the opposite side of the motor cylinder device 16A in the widthwise direction. Furthermore, when the input device 14, the motor cylinder device 16A, the VSA device 18 are all arranged at the same side in this vehicle brake system 10E as described above, it may be only necessary to prepare piping having an enough length to connect the input device 14 and the motor cylinder device 16A and piping having an enough length to connect the motor cylinder device 16A and the VSA device 18. In other words, it may be only necessary to prepare piping having approximately the same length as the piping connecting the input device 14 and the VSA device 18. The piping length can be further more shortened than that of the embodiments illustrated in FIGS. 7 and 8.

Figure 13A:
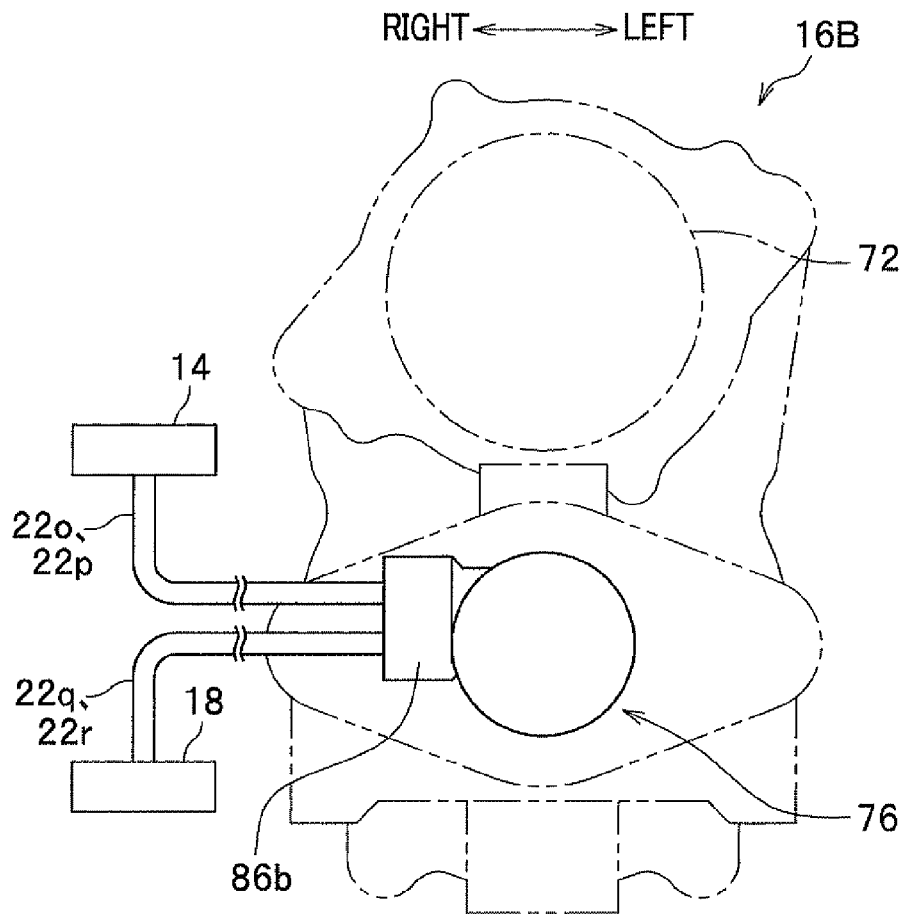
FIG. 13A is a front view.

Note that as illustrated in FIG. 12, the configuration is not limited to a configuration in which the cylinder mechanism 76 of the motor cylinder device 16A includes a separate port per port (the input ports 24c and 24d and the output ports 24a and 24b). As illustrated in FIG. 13A, the motor cylinder device 16B may include an individual boss (protruding portion) 86b having the input port 24c (24d) and the output port 24a (24b).

Figure 13B:
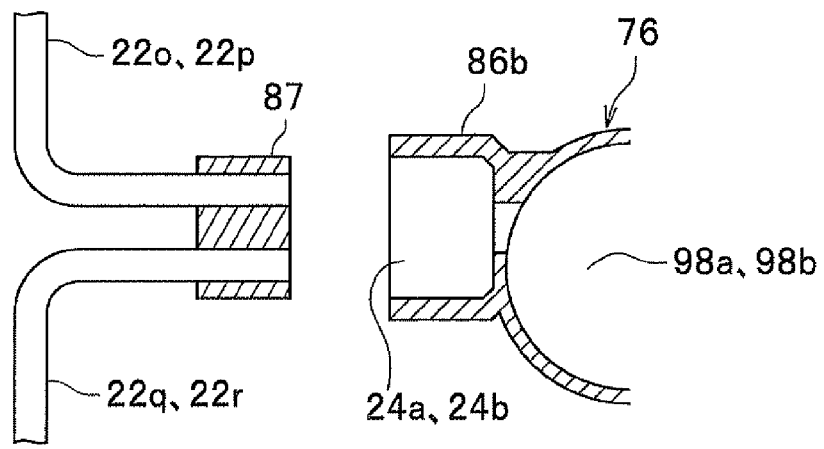
FIG. 13B is a cross-sectional view when the device is cut at a position of a port.

Specifically, as illustrated in FIG. 13B, a connector 87 having the fifteenth pipe 22o (the sixteenth pipe 22p) and the seventeenth pipe 22q (the eighteenth pipe 22r) connected is to be inserted into a boss 86b which is in communication with the first hydraulic chamber 98a (the second hydraulic chamber 98b) of the cylinder mechanism 76 in the motor cylinder device 16B. The connector 87, for example, is screwed into the port 24a (24b), allowing for free attachment and detachment. That is, in the embodiment illustrated in FIG. 13, the first hydraulic chamber 98a and the second hydraulic chamber 98b correspond to the couplers A1 and A2, respectively, in the first embodiment.

The embodiment illustrated in FIG. 13 can exert substantially the same effects as in the first embodiment. Further, the input device 14, the motor cylinder device 16B, and the VSA device 18 may be all arranged at the same side in the engine room R in a widthwise direction of a vehicle. Accordingly, the entire piping length can be shortened in a manner similar to the embodiments illustrated in FIGS. 11 and 12.

As described above, in this embodiment, the input device 14 or 14A, the motor cylinder device 16, 16A, or 16B, and the VSA device 18 are separated. This arrangement can make a pipe connection pattern vary, thereby increasing a mounting freedom in this regard.

Note that in this embodiment, the input device 14 is used for a right-hand drive vehicle as an example for description. The embodiment, however, is not limited to the right-hand drive vehicle, but the input device 14 is applicable to a left-hand drive vehicle. In this case, for example, the input device 14 is mounted on the dashboard 2 by using a bolt at the left side in a widthwise direction of a vehicle; the motor cylinder device 16 is likewise mounted on the front side frame 1b at the right side, the opposite side of the input device 14, in the widthwise direction; and the VSA device 18 is mounted in front of the input device 14 or the motor cylinder device 16.

In addition, the position of the motor cylinder device 16 is not limited to the rear side of the front side frame 1a, but may be the front side. Also, the position is not limited to the inner surface of the front side frame 1a, but may be the upper surface side or the lower surface side of the front side frame 1a. Further, the motor cylinder device 16 may be attached to, for example, the dashboard 2 or the damper housing 1f. Moreover, the orientation of the motor cylinder device 16 is not limited to a configuration in which the cylinder mechanism 16 is directed in a front-rear direction, but may be a configuration in which the cylinder mechanism 16 is directed in a widthwise direction.

Figure 14:
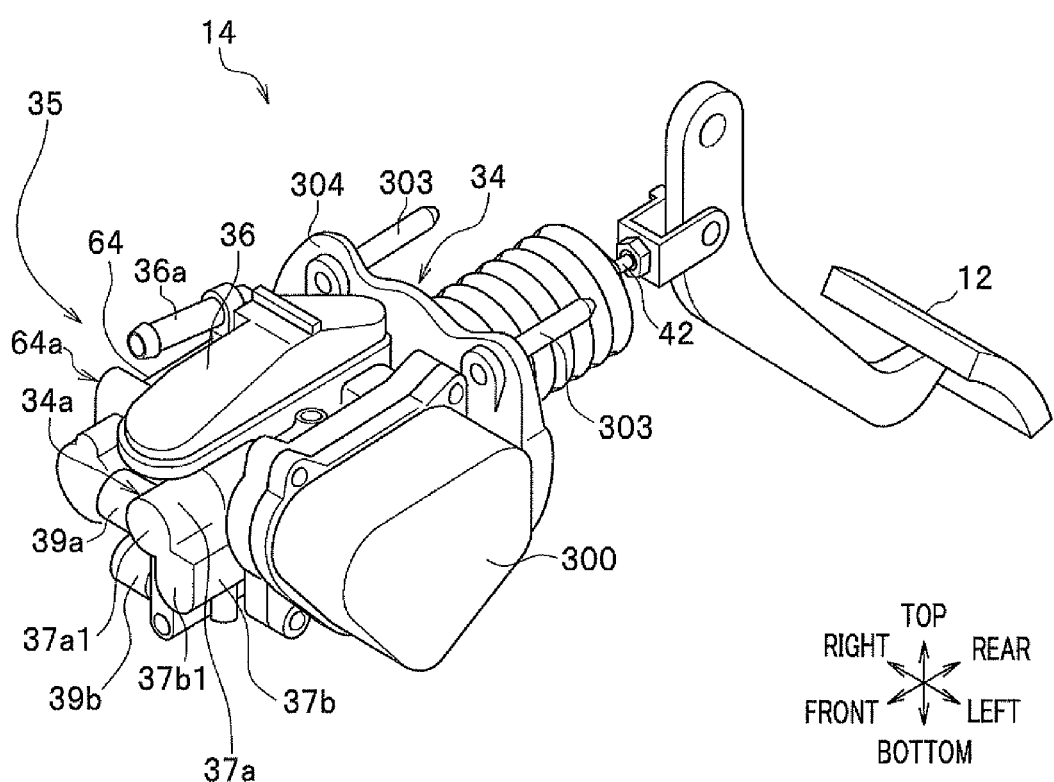
FIG. 14 is a perspective view illustrating a whole input device according to an embodiment.
Figure 15:
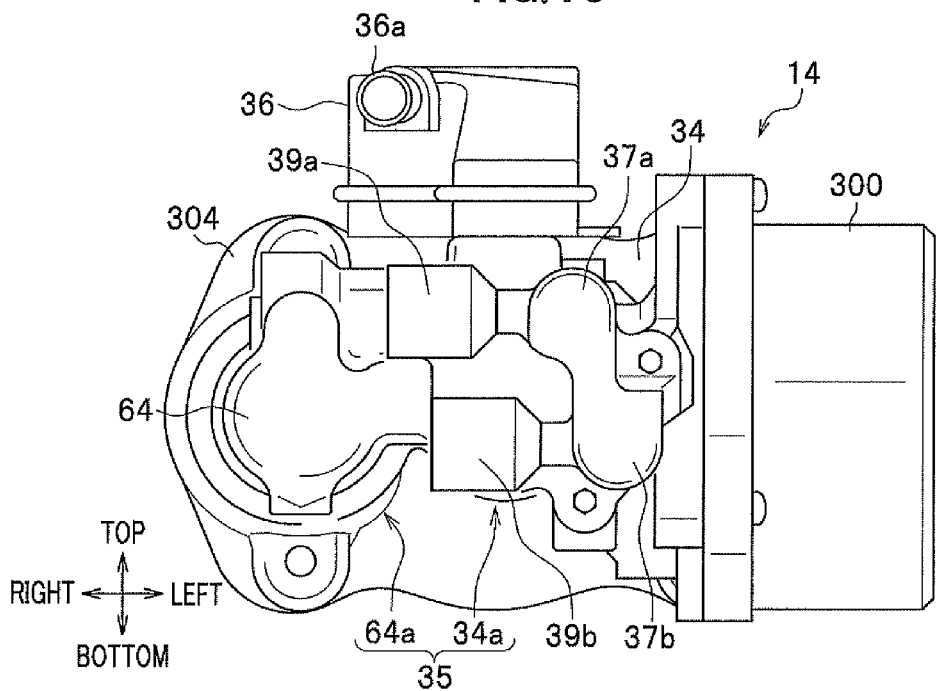
FIG. 15 is a front view illustrating an input device according to an embodiment.
Figure 16:
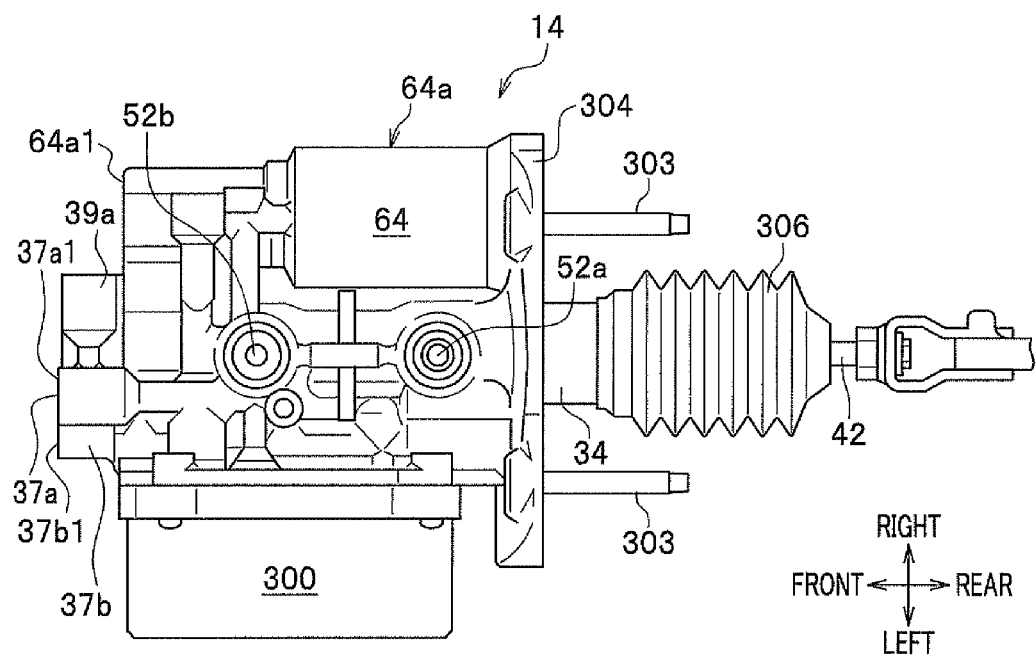
FIG. 16 is a top view illustrating an input device according to an embodiment.
Figure 17:
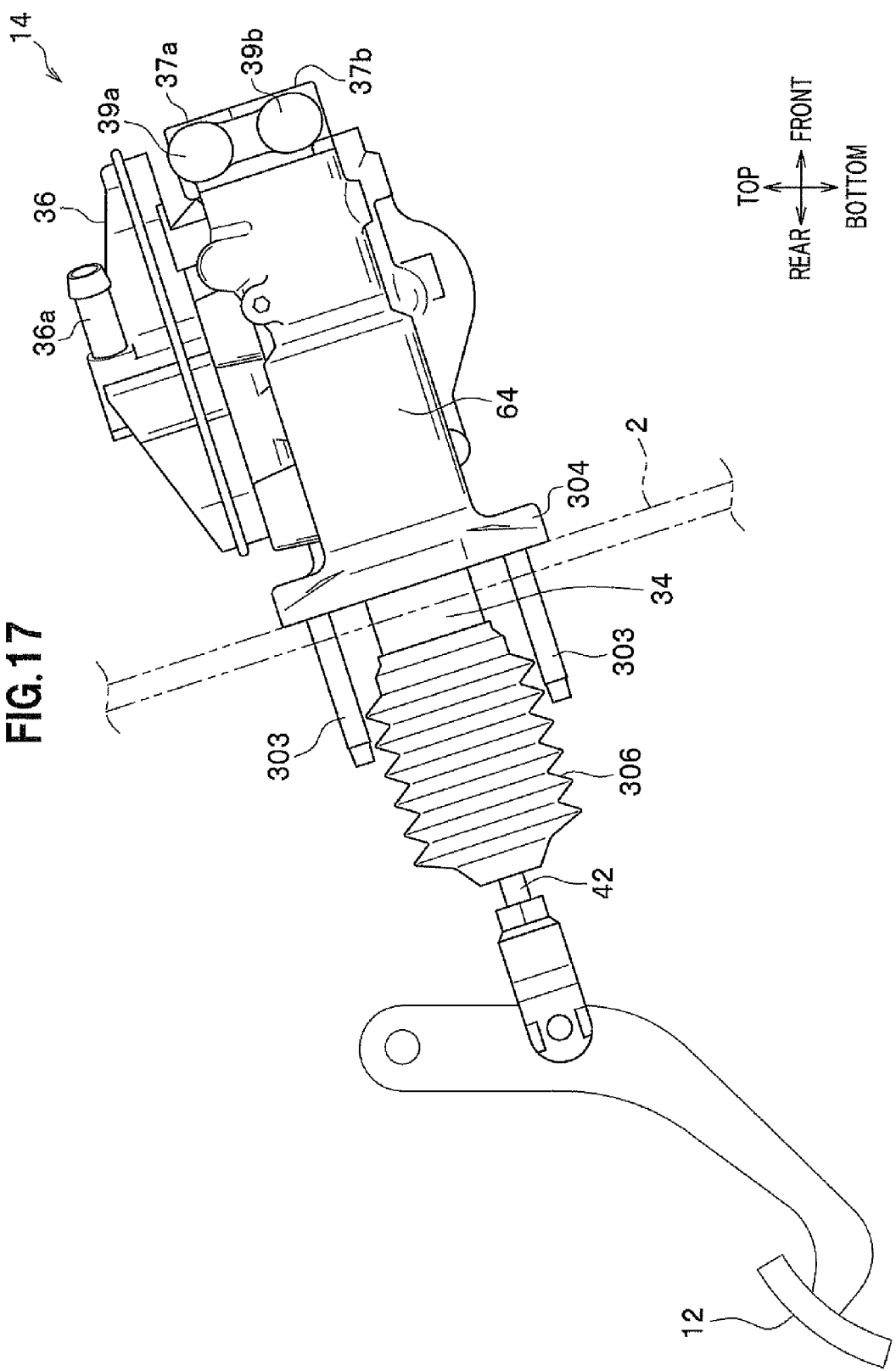
FIG. 17 is a right side view illustrating an input device according to an embodiment.
Figure 18A:
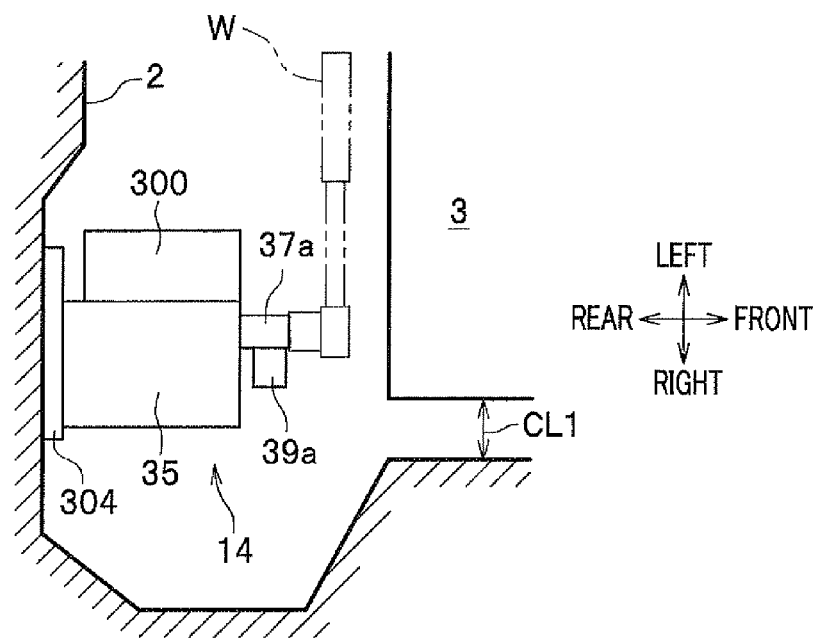
FIG. 18A is a top view.
Figure 18B:
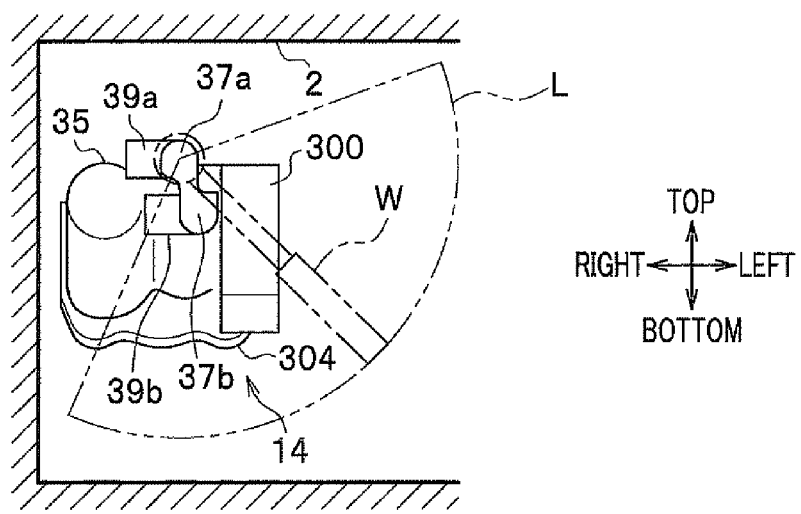
FIG. 18B is a front view.
Figure 19A:
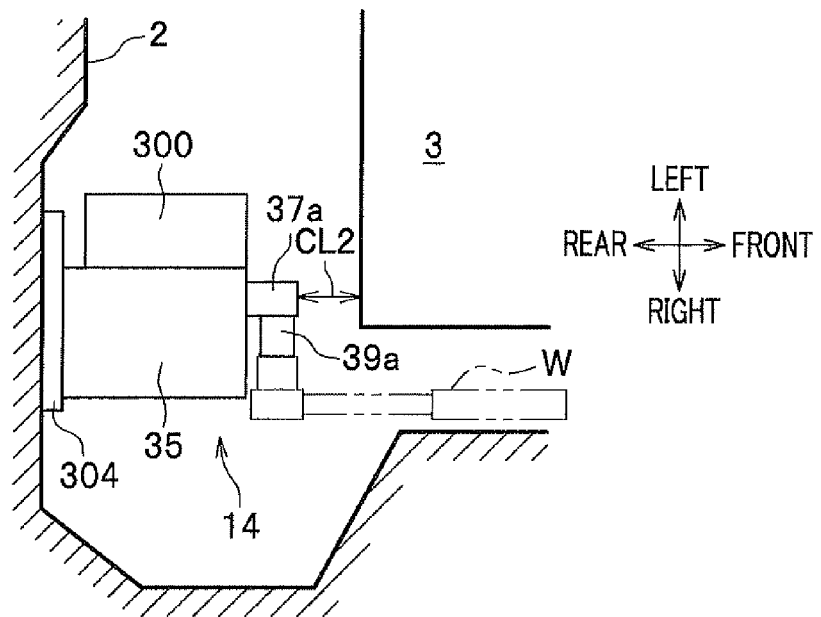
FIG. 19A is a top view.
Figure 19B:
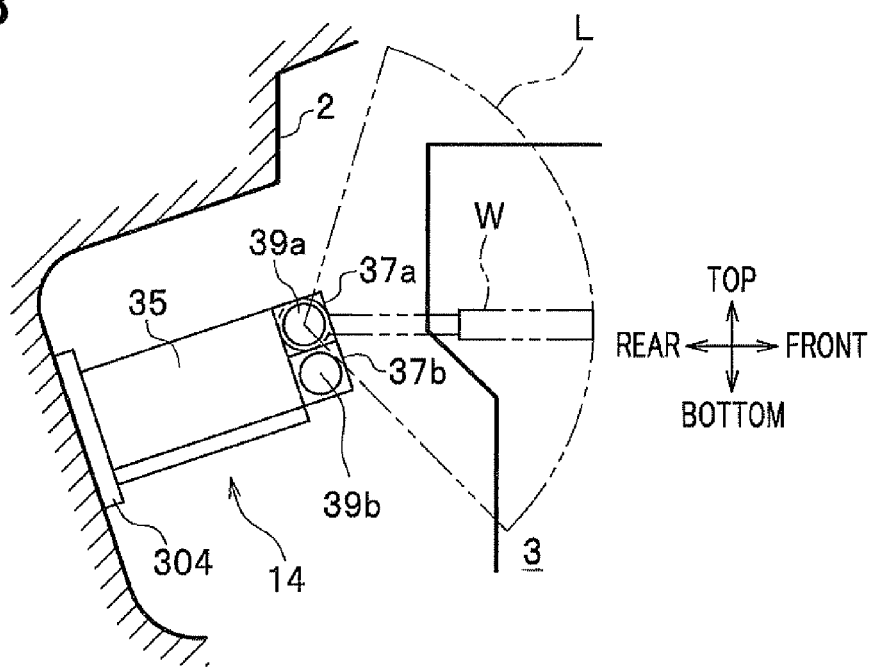
FIG. 19B is a front view.
Figure 20:
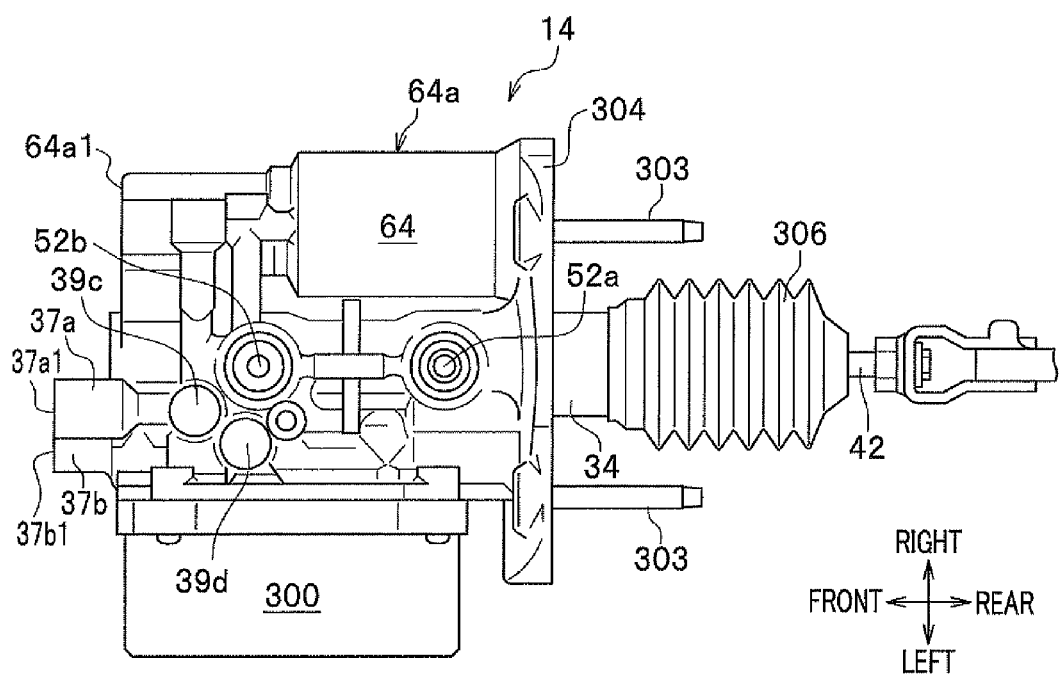
FIG. 20 is a top view illustrating an input device according to a modified embodiment.

The following further describes the input device 14 according to embodiments with reference to FIGS. 14 to 20. The following input device 14 is applicable to each embodiment described above. FIG. 14 is a perspective view illustrating a whole input device according to an embodiment. FIG. 15 is a front view illustrating an input device according to an embodiment. FIG. 16 is a top view illustrating an input device according to an embodiment. FIG. 17 is a right side view illustrating an input device according to an embodiment. FIG. 18 is schematic diagrams illustrating how to deploy a tool when a pipe is connected to an input device according to an embodiment. FIG. 18A is a top view. FIG. 18B is a front view. FIG. 19 is schematic diagrams illustrating another example of how to deploy a tool when a pipe is connected to an input device according to an embodiment. FIG. 19A is a top view. FIG. 19B is a front view. FIG. 20 is a top view illustrating an input device according to a modified embodiment. Note that for convenience of drawing, the illustration of the first reservoir and the brake pedal in FIG. 12 is omitted in FIG. 16. In addition, mechanisms similar to those described in FIG. 2 have been built in the input device 14, so there description is also omitted.

As illustrated in FIG. 14, the master cylinder 34 included in the input device 14 extends in a front-rear direction of the vehicle V (see FIG. 1). The stroke simulator 64 and this master cylinder 34 are integrated and disposed in parallel. More specifically, the stroke simulator 64 of this embodiment is arranged in parallel at the right side (an outer side in a widthwise direction of the vehicle) of the master cylinder 34. Meanwhile, the master cylinder 34 and the stroke simulator 64 according to this embodiment, as well as a stud plate 304 that supports these members at its rear side, are produced as a metal-made all-in-one molded product. By doing so, a simulator housing 64a, which is an exterior of the stroke simulator 64, and a master cylinder housing 34a, which is an exterior of the master cylinder 34, are continuously formed, and constitute a housing 35.

The first reservoir 36 having an elongated outline is arranged above the master cylinder 34 and the stroke simulator 64, and extends in a front-rear direction between the master cylinder 34 and the stroke simulator 64. This first reservoir 36 is connected via connection ports that have been formed facing the relief ports 52a and 52b (see FIG. 16) and the supply ports 46a and 46b (see FIG. 2) to the first and second pressure chambers 56a and 56b and the back chambers 48a and 48b of the master cylinder 34 as illustrated in FIG. 2. Note that in FIG. 14, the reference sign 36a denotes a connector that connects to a base end of the pipe 86 which connects the first reservoir 36 and the second reservoir 84 as illustrated in FIG. 2. This connector 36a is made of a tubular member which projects forward of the input device 14.

Note that the connector 36a is not limited to the above configuration. When the first reservoir 36 is divided due to some layout issues, the connector 36a may play a role of connecting one reservoir and another reservoir.

In addition, a first boss 37a and a second boss 37b which are formed projecting forward is produced at the front side of the master cylinder housing 34a. Note that the first boss 37a and the second boss 37b shown in FIG. 14 are depicted as a preprocessed condition having no port. The front sides of the first boss 37a and the second boss 37b have flat working surfaces 37a1 and 37b1.

As illustrated in FIG. 15, the master cylinder housing 34a has a third boss 39a at the right lateral side of the first boss 37a and a fourth boss 39b at the right lateral side of the second boss 37b. Each of the third boss 39a and the fourth boss 39b is formed facing the right side. Also, as illustrated in FIG. 15, the third boss 39a is positioned at the right side (at the stroke simulator 64 side) of the fourth boss 39b.

As illustrated in FIG. 16, the first boss 37a and the second boss 37b each project to a position more forward than the front surface 64a1 of the simulator housing 64a. In addition, the third boss 39a and the fourth boss 39b are formed so as not to project to a position more forward than the working surface 37a1 at the front end of the first boss 37a or the working surface 37b1 at the front end of the second boss 37b.

In the housing 35 (master cylinder housing 34a) as so produced, a hole to pass brake fluid through is created on the first boss 37a or the third boss 39a. By doing so, the first hydraulic passage 58a in communication with the first pressure chamber 56a is formed, and the connection port 20a is formed at the first boss 37a or the third boss 39a. Also, in the housing 35 (master cylinder housing 34a), a hole to pass brake fluid through is created on the second boss 37b or the fourth boss 39b. By doing so, the second hydraulic passage 58b in communication with the second pressure chamber 56b is formed, and the connection port 20b is formed at the second boss 37b or the fourth boss 39b.

The first shut-off valve 60a, the second shut-off valve 60b, and the third shut-off valve 62 as illustrated in FIG. 2 are each disposed at a position at which the first hydraulic passage 58a, the second hydraulic passage 58b, and the hydraulic passage branch 58c, respectively, all of which have been formed in the housing 35, are blocked.

In addition, the input device 14 includes a sensor bulb unit 300 at the left side of the master cylinder 34. In a resin-made housing, this sensor bulb unit 300 includes: the first hydraulic pressure sensor Pm and the second hydraulic pressure sensor Pp as illustrated in FIG. 2; an electric circuit board (not shown) for processing a pressure detection signal as obtained with these sensors; and the first shut-off valve 60a, the second shut-off valve 60b, and the third shut-off valve 62 (any of the valves is controlled by the above electric circuit board) as illustrated in FIG. 2. Note that the first hydraulic pressure sensor Pm and the second hydraulic pressure sensor Pp are disposed facing monitor holes (not shown) that are in communication with the first hydraulic passage 58a and the second hydraulic passage 58b, respectively. By doing so, the sensors can detect each hydraulic pressure as described above. In this regard, the monitor holes are created at the left side (on the surface to which the sensor bulb unit 300 is attached) of the master cylinder housing 34a as illustrated in FIG. 16. The holes extend to the first hydraulic passage 58a and the second hydraulic passage 58b.

As illustrated in FIG. 17, the rear terminal of the master cylinder 34 further extends from the stud plate 304 in a rear direction at the rear side of the input device 14. Further, the rear terminal of the master cylinder 34 accepts a first end of the push rod 42 whose second end is attached to the brake pedal 12 as described previously. Note that the reference sign 306 in FIG. 17 denotes a boot that covers over the master cylinder 34 and the push rod 42. Moreover, the input device 14 according to this embodiment is mounted along the slope of the dashboard 2 at its installation position. That is, the master cylinder 34 is inclined in an axial direction so as to have a rising slope toward the front of the vehicle.

The following describes advantages of the input device 14 of the vehicle brake system 10.

In this input device 14, the first boss 37a, the second boss 37b, the third boss 39a, and the fourth boss 39b are formed beforehand under a condition in which holes to pass brake fluid through the housing 35 are unprocessed. Ports at, for example, the first boss 37a and the second boss 37b (or the third boss 39a and the fourth boss 39b) are optionally selected and can be processed. Note that into the bosses having the processed ports (the first boss 37a and the second boss 37b or the third boss 39a and the fourth boss 39b) are screwed connectors (not shown) for connecting the connection ports 20a and 20b to the pipes 22a and 22d (see FIG. 1). By doing so, the pipes 22a and 22c are attached to the input device 14. In view of the above, it is necessary to allow the surrounding of the bosses (the first boss 37a, the second boss 37b, the third boss 39a, and the fourth boss 39b) a clearance which makes it possible to work with a tool (see FIG. 18) while the connector is screwed in.

Meanwhile, as illustrated in FIG. 18A, a clearance CL1 between the right lateral side of the power device 3 and the vehicle body (e.g., the damper housing 1g) might not have an enough space which makes it possible to work with a tool W (e.g., a wrench) when the pipes 22a and 22d are connected. In that case, instead of using the third boss 39a and the fourth boss 39b as ports, the first boss 37a and the second boss 37b can be used as ports. For that purpose, the ports are to be processed in the first boss 37a and the second boss 37b. In this case, a tool W is deployed on the first boss 37a facing forward as illustrated in FIGS. 18A and 18B. The tool W is fitted into the connector and is moved in a predetermined direction. By doing so, the pipe 22a can be connected via the connector (not shown) to the port (the connection port 20a) formed in the first boss 37a. Likewise, the pipe 22d can be connected via the connector (not shown) to the port (the connection port 20b) formed in the second boss 37b.

A fan-like region L denoted by the chain double-dashed line in FIG. 18B represents a trajectory of the tool W. In addition, as illustrated in FIG. 18B, a plurality of members are combined to build the dashboard 2 whose top portion projects in a forward direction (see FIG. 19B described below). In this regard, examples of a case where the clearance CL1 cannot be allowed include such a case of a hybrid vehicle, namely a case where an engine 3a, an electric motor 3b, and a transmission (not shown) are disposed in parallel in a widthwise direction so that a vehicle V carries a power device 3 whose widthwise size becomes large.

As illustrated in FIG. 19A, a clearance CL2 between the power device 3 and the input device 14 cannot be used for mounting the pipes 22a and 22d with a tool W when the pipes 22a and 22d are connected. In that case, ports are constructed on the third boss 39a and the fourth boss 39b (while the first boss 37a and the second boss 37b are unprocessed) so as to be able to use the third boss 39a and the fourth boss 39b as ports. In this case, as illustrated in FIGS. 19A and 19B, the tool W is fitted to the connectors in the third boss 39a and the fourth boss 39b, whose port openings are disposed at the right lateral side, and is moved in a predetermined direction. By doing so, the pipe 22a can be connected via the connector to the port (the connection port 20a) formed in the third boss 39a. Likewise, the pipe 22d can be connected via the connector to the port (the connection port 20b) formed in the fourth boss 39b.

When any of the clearances CL1 and CL2 is available, any of the first boss 37a, the second boss 37b, the third boss 39a, and the fourth boss 39b can be selected to produce a port. Note that regarding the first boss 37a and the second boss 37b, it is not necessary to form a pair of ports. For example, ports may be made in the first boss 37a and the fourth boss 39b. Also, ports may be made in the second boss 37b and the third boss 39a, so that one connection port 20a and the other connection port 20b may have different orientations.

In view of the above, with regard to the input device 14 according to this embodiment, the input device 14 may be included in a hybrid vehicle having difficulty allowing the clearance CL1. In that case, as illustrated in FIGS. 18A and 18B, ports are made in the first boss 37a and the second boss 37b. When the input device 14 is included in a different car model (e.g., an engine-driven vehicle) having difficulty allowing the clearance CL2, ports are made in the third boss 39a and the fourth boss 39b as illustrated in FIGS. 19A and 19B. Accordingly, the bosses having the connection ports 20a and 20b can be suitably selected depending on the car model of the vehicle V. On top of that, this embodiment has four bosses (the first boss 37a, the second boss 37b, the third boss 39a, and the fourth boss 39b) that have been formed beforehand in the housing 35. Thus, a mold to form the housing 35 for the input device 14 can be shared between a hybrid vehicle and different car models, which is cost efficient.

In addition, if ports are made in the first boss 37a and the second boss 37b to produce the connection ports 20a and 20b, it may be possible to create a tool insertion hole for brake fluid filling and/or air bleeding on the unprocessed (not yet processed) bosses 39a and 39b. Note that, if ports are made in the third boss 39a and the fourth boss 39b to produce the connection ports 20a and 20b, it may be possible to create a tool insertion hole for brake fluid filling and/or air bleeding on the first boss 37a and the second boss 37b. In view of the above, there is no need to produce a new boss in order to create a tool insertion hole for brake fluid filling and/or air bleeding. This can make it easier to create the tool insertion hole.

Further, the tip (front end) of the input device 14 is inclined and has a rising slope (see FIG. 17). This arrangement makes it possible to easily bleed the contaminated air at maintenance such as when brake fluid is filled or replaced.

Furthermore, the four bosses (the first boss 37a, the second boss 37b, the third boss 39a, and the fourth boss 39b) are formed beforehand in the housing 35. For example, the connecting ports 20a and 20b for connecting to the motor cylinder device 16 are formed in the first boss 37a and the second boss 37b. Also, the connecting ports 20c and 20d (see FIG. 10) for connecting to the VSA device 18 are formed in the third boss 39a and the fourth boss 39b. By doing so, the input device 14 can include the connection ports (see FIGS. 8 to 10).

The input device 14 as so constructed has four bosses (the first boss 37a, the second boss 37b, the third boss 39a, and the fourth boss 39b) that have been formed beforehand in the housing 35, having piping configuration as illustrated in FIGS. 8 to 10. In that case, the first boss 37a has the connection port 20a; the second boss 37b has the connection port 20b; the third boss 39a has the connection port 20c; and the fourth boss 39b has the connection port 20d. In such a configuration, it is possible to provide the input device 14 having four ports. In view of the above, a mold to form the housing 35 can be shared between the vehicle brake systems 10A and 10D having different piping configurations as illustrated in FIG. 1 and FIGS. 8 to 10, which is cost efficient.

Note that with regard to the description of the input device 14 according to the above embodiment, the first boss 37a and the second boss 37b are directed forward, and the third boss 39a and the fourth boss 39b are directed rightward. However, as illustrated in FIG. 20, the first boss 37a and the second boss 37b may be directed forward, and the third boss 39c and the fourth boss 39d may be directed upward.

In addition, the first boss 37a and the second boss 37b may be directed forward, and the third boss 39c and the fourth boss 39d may be directed leftward. Further, the first boss 37a and the second boss 37b may be directed forward, and the third boss 39c and the fourth boss 39d may be directed downward.

Furthermore, the above embodiment has been described by taking as an example a case where four bosses (the first boss 37a, the second boss 37b, the third boss 39a, and the fourth boss 39b) are formed in the housing 35. The cases, however, are not limited to the above case. Accordingly, six bosses or seven or more bosses may be formed beforehand. When the six bosses are taken as an example, the "front", "top", "bottom", "right", and "left" can be appropriately selected for configuration. Moreover, a pair of bosses are not necessarily limited in such a manner that each boss is directed in a different direction, but some or all the bosses may be directed in the same direction.

REFERENCE SIGNS LIST

2 Dashboard
1g Damper housing 10A, 10B, 10C Vehicle brake system
14 Input device
16, 16A, 16B Motor cylinder device (Electric brake actuator)
18 VSA device (Vehicle behavior-stabilizing device)
22a First pipe (First piping)
22b' Second pipe (Second piping)
22c Third pipe (First piping)
22d Fourth pipe (First piping)
22e' Fifth pipe (Second piping)
22f Sixth pipe (First piping)
23a, 23b Joint (Pipe with three branches)
36 First reservoir (Reservoir)
72 Electric motor
76 Cylinder mechanism
R Engine room (Room for structures)
V Vehicle

The invention claimed is:

1. A vehicle brake system, comprising:
an input device which receives an operator's brake operation;
an electric brake actuator which generates a brake hydraulic pressure based on an electric signal according to at least the brake operation; and
a vehicle behavior-stabilizing device which assists vehicle behavior stabilization based on the brake hydraulic pressure generated in the electric brake actuator,
wherein the input device, the electric brake actuator, and the vehicle behavior stabilizing device are separately disposed from one another in a room for structures, the room being partitioned in front of a dashboard; and
the input device comprises a housing including:
a master cylinder which generates a hydraulic pressure according to an input through operation of a brake operator, the master cylinder extending in a front-rear direction of a vehicle; and
a stroke simulator giving a brake operator a simulated operation reaction force, the stroke simulator being disposed in parallel to and in communication with the master cylinder, so that the stroke simulator and the master cylinder are integrated,
wherein bosses are formed beforehand at a plurality of locations in the housing;
a port can be produced in the boss at any of the locations; and
the port is formed to project forward of the input device.

2. The vehicle brake system according to claim 1, wherein the input device is attached to the dashboard; and the electric brake actuator is disposed at a position distal from the input device.

3. The vehicle brake system according to claim 1, wherein the input device and the vehicle behavior-stabilizing device are connected via first piping; the electric brake actuator is connected using a pipe with three branches to the first piping; and second piping is used to connect the electric brake actuator to the first piping connecting the input device and the vehicle behavior-stabilizing device, the second piping being disposed near the first piping.

4. The vehicle brake system according to claim 1, wherein the input device has a reservoir which supplies brake fluid to the electric brake actuator; and the electric brake actuator is disposed below the input device.

5. The vehicle brake system according to claim 1, wherein the electric brake actuator is arranged at an opposite side of the vehicle behavior-stabilizing device in a widthwise direction of a vehicle.

6. The vehicle brake system according to claim 1, wherein the electric brake actuator is arranged at the same side of the vehicle behavior-stabilizing device in a widthwise direction of a vehicle.

7. The vehicle brake system according to claim 1, wherein the input device, the electric brake actuator, and the vehicle behavior-stabilizing device are all arranged in the same side of a vehicle in a widthwise direction.

8. The vehicle brake system according to claim 1, wherein the electric brake actuator is disposed in rear of the vehicle behavior-stabilizing device.

9. The vehicle brake system according to claim 1, wherein the vehicle behavior-stabilizing device is disposed above the input device.

10. The vehicle brake system according to claim 1, wherein the input device and a damper housing installed in the room for structures overlap in a front-rear direction of a vehicle.

11. A vehicle brake system, comprising:
an input device which receives an operator's brake operation;
an electric brake actuator which generates a brake hydraulic pressure based on an electric signal according to at least the brake operation; and
a vehicle behavior-stabilizing device which assists vehicle behavior stabilization based on the brake hydraulic pressure generated in the electric brake actuator,
wherein the input device, the electric brake actuator, and the vehicle behavior stabilizing device are separately disposed from one another in a room for structures, the room being partitioned in front of a dashboard;
the input device, the electric brake actuator, and the vehicle behavior stabilizing device are connected via piping which transports brake fluid;
the input device includes a master cylinder capable of generating a hydraulic pressure in a wheel cylinder at a time of an abnormal condition of the electric brake actuator; and
the vehicle behavior-stabilizing device and the electric brake actuator are each connected via independent piping to an output port of the master cylinder.

12. The vehicle brake system according to claim 1, wherein the input device, the electric brake actuator, and the vehicle behavior-stabilizing device are connected via piping which transport brake fluid;
the input device includes a master cylinder capable of generating a hydraulic pressure in a wheel cylinder at a time of an abnormal condition of the electric brake actuator; and
an output port of the master cylinder is connected via a pipe with branches on piping connecting the vehicle behavior-stabilizing device and the electric brake actuator.

13. The vehicle brake system according to claim 11, wherein a port produced is connected to the vehicle behavior-stabilizing device which assists the vehicle behavior stabilization based on the brake hydraulic pressure generated in the electric brake actuator.

14. The vehicle brake system according to claim 11, wherein a port to connect to the electric brake actuator is produced in an unprocessed boss.

15. The vehicle brake system according to claim 11, wherein a tool insertion hole for brake fluid filling and/or for air bleeding is created in an unprocessed boss.

* * * * *